United States Patent
Ohwatari et al.

(10) Patent No.: US 9,173,113 B2
(45) Date of Patent: Oct. 27, 2015

(54) MOBILE COMMUNICATION TERMINAL

(75) Inventors: Yusuke Ohwatari, Chiyoda-ku (JP);
Nobuhiko Miki, Chiyoda-ku (JP);
Takahiro Asai, Chiyoda-ku (JP);
Yukihiko Okumura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 256 days.

(21) Appl. No.: 13/821,712

(22) PCT Filed: Apr. 19, 2012

(86) PCT No.: PCT/JP2012/060595
§ 371 (c)(1),
(2), (4) Date: Mar. 8, 2013

(87) PCT Pub. No.: WO2012/147616
PCT Pub. Date: Nov. 1, 2012

(65) Prior Publication Data
US 2013/0163462 A1 Jun. 27, 2013

(30) Foreign Application Priority Data

Apr. 25, 2011 (JP) .................................. 2011-096955

(51) Int. Cl.
*H04W 24/02* (2009.01)
*H04B 7/08* (2006.01)
(Continued)

(52) U.S. Cl.
CPC ............. *H04W 24/02* (2013.01); *H04B 7/0851* (2013.01); *H04B 7/0857* (2013.01);
(Continued)

(58) Field of Classification Search
None
See application file for complete search history.

(56) References Cited

U.S. PATENT DOCUMENTS

| 6,128,355 A | 10/2000 | Backman et al. |
| 6,172,970 B1 | 1/2001 | Ling et al. |

(Continued)

FOREIGN PATENT DOCUMENTS

| CN | 1263653 A | 8/2000 |
| JP | 2000 511370 | 8/2000 |

(Continued)

OTHER PUBLICATIONS

3GPP TSG RAN WG1 Meeting # 64, R1-111031, "On advanced UE MMSE receiver modeling in system simulations," Nokia, Nokia Siemens Networks, Total 10 pages, (Feb. 21-25, 2011).

(Continued)

*Primary Examiner* — Kouroush Mohebbi
(74) *Attorney, Agent, or Firm* — Oblon, McClelland, Maier & Neustadt, L.L.P.

(57) ABSTRACT

A mobile communication terminal includes an interference rejection combining processor for obtaining a received signal vector with regard to each of multiple resource elements and for calculating receiving weights so as to suppress influence to a desired beam of electric wave sent from the desired base station by other beams, on the basis of the received signal vectors; a non-interference-rejection receiving weight calculator for calculating receiving weights so as not to suppress influence to the desired beam by other beams; a signal separator for separating a signal destined for the mobile communication terminal from signals destined for other mobile communication terminals; and an interference rejection combining determiner for determining whether the receiving weights to suppress influence by other beams or the receiving weights calculated by the non-interference-rejection receiving weight calculator should be used for signal separation by the signal separator, on the basis of an index representing a relationship between reception quality of a desired downlink transmission signal and reception quality of an interfering signal.

17 Claims, 12 Drawing Sheets

(51) Int. Cl.
- *H04L 5/00* (2006.01)
- *H04L 25/03* (2006.01)
- *H04L 1/00* (2006.01)

(52) U.S. Cl.
CPC ............ *H04B 7/0865* (2013.01); *H04B 7/0871* (2013.01); *H04L 1/0036* (2013.01); *H04L 1/0003* (2013.01); *H04L 1/0009* (2013.01); *H04L 1/0026* (2013.01); *H04L 5/0023* (2013.01); *H04L 5/0051* (2013.01); *H04L 25/03891* (2013.01)

(56) References Cited

U.S. PATENT DOCUMENTS

2003/0185285 A1   10/2003   Talwar et al.
2011/0085627 A1*  4/2011    Kangas et al. ................ 375/346

FOREIGN PATENT DOCUMENTS

| JP | 2002 508898 | 3/2002 |
|----|-------------|--------|
| JP | 2003 333669 | 11/2003 |
| JP | 2006 507710 | 3/2006 |
| WO | WO 98/53560 A1 | 11/1998 |
| WO | WO 2010008327 A1 * | 1/2010 |

OTHER PUBLICATIONS

Thiele, L. et al., "On the Value of Synchronous Downlink MIMO-OFDMA Systems with Linear Equalizers," Fraunhofer Institute for Telecommunications, Heinrich-Hertz-Institut Einsteinufer 37, IEEE ISWCS 2008, Total 5 pages, (2008).

3GPP TS 36.211 V10.0.0, "3$^{rd}$ Generation Partnership Project; Technical Specification Group Radio Access Network; Evolved Universal Terrestrial Radio Access (E-UTRA); Physical channels and modulation (Release 10)," Total 103 pages, (Dec. 2010).

International Search Report Issued May 22, 2012 in PCT/JP12/60595 Filed Apr. 19, 2012.

Extended European Search Report issued Oct. 22, 2014 in Patent Application No. 12776930.5.

Japanese Office Action issued Aug. 13, 2013 in Japanese Patent Application No. 2011-096955 (with English-language translation).

Office Action and Search Report issued Dec. 29, 2014 in Chinese Patent Application No. 201280003283.4 (with English language translation).

Office Action issued Jul. 14, 2015 in Chinese Patent Application No. 201280003283.4 (with English translation).

* cited by examiner

MOBILE COMMUNICATION TERMINAL

FIELD OF THE INVENTION

The present invention relates to a mobile communication terminal.

BACKGROUND ART

In LTE (Long Term Evolution) Advanced of 3GPP (Third Generation Partnership Project), OFDMA (Orthogonal Frequency Division Multiplexing Access) using MU-MIMO (multi-user multiple-input multiple-output) has been proposed. In MU-MIMO downlink transmission, a base station is able to not only communicate with multiple mobile communication terminals, but also to transmit different data streams (layers) simultaneously to a mobile communication terminal.

In addition, in LTE Advanced, a reception technique for mobile communication terminals called as interference rejection combining has been discussed. Interference rejection combining (IRC) is a technique for downlink communication, in which a mobile communication terminal gives weights to signals obtained by reception antennas so as to suppress interference to the desired electric wave beam from the visited base station (desired base station) caused by interfering electric wave beams from interfering base stations at the mobile communication terminal. IRC improves the reception quality of desired signals on a desired electric wave beam especially in a case in which a mobile communication terminal 10 is located near the boundary of a visited cell 1a (cell of the desired base station 1) and receives strong interfering electric wave beams from another base station 2 (interfering base station) as shown in FIG. 1. In FIG. 1, reference symbol 2a denotes the cell of the interfering base station 2. In addition, in FIG. 1, a general shape of a beam 1b generated at the desired base station 1, and a general shape of the beam 2b generated at the interfering base station 2 are illustrated. A part of the beam 2b generated at the interfering base station 2, i.e., a part of a beam for downlink channels for other mobile communication terminals (for example, a mobile communication terminal 12) causes an interfering signal for the mobile communication terminal 10.

IRC is described in, for example, Patent Document 1, Non-patent Document 1, and Non-patent Document 2.

In an IRC reception technique, reception weights $W_{MMSE,\,i}$ for a mobile communication terminal that receives signals can be calculated with the use of Equation (1) below derived from an MMSE (minimum mean-square-error) algorithm.

$$W_{MMSE,i} = P_s(H_i W_{TX,i})^H \left( \sum_{i=1}^{N_{UE}} P_s(H_i W_{TX,i})(H_i W_{TX,i})^H + \sigma_i^2 I \right)^{-1} \quad (1)$$

Equation (1) can be utilized in a case in which information on all downlink channels that may cause large interference can be estimated. In Equation (1), suffix i in each parameter denotes the number of the mobile communication terminal. In Equation (1), $P_s$ is a scalar indicative of a transmission power per symbol from the desired base station for a mobile communication terminal #i. $H_i$ is a channel matrix (channel impulse matrix) of the mobile communication terminal #i. In this channel matrix, the number of rows is the number of receiving antennas of the mobile communication terminal #i, whereas the number of columns is the number of transmitting antennas of the desired base station for the mobile communication terminal #i. In summary, this channel matrix is a channel matrix of downlink channels to the mobile communication terminal #i from the desired base station for the mobile communication terminal #i. $W_{TX,\,i}$ is a precoding matrix generated at the desired base station for the mobile communication terminal #i and used for downlink transmission from the desired base station to the mobile communication terminal #i. This precoding matrix has rows of which the number is the number of transmitting antennas of the desired base station for the mobile communication terminal #i, and columns of which the number is the number of the transmission layers, i.e., the number of the transmission streams transmitted from the desired base station for the mobile communication terminal #i. If the number of transmitting antennas of the base station is one, this precoding matrix is a scalar. (With this respect, Equation (1) can be also used in SIMO (single-input multiple-output).)

$\sigma_i^2$ indicates a noise power at the mobile communication terminal #i, and $\sigma_i$ is a standard deviation of the noise power. I is an identity matrix.

$N_{UE}$ is the sum of the total number of mobile communication terminals that receive downlink channels that may significantly interfere with the downlink channel received by the mobile communication terminal for which the receiving weights are to be calculated, and 1 (the number of mobile communication terminal for which the receiving weights are to be calculated). "Downlink channels that may significantly interfere with the downlink channel received by the mobile communication terminal" mean downlink channels that use the same frequency as that for the desired downlink channel.

Superscript H on the right side in the Equation (1) denotes complex conjugate transpose.

According to Equation (1), each mobile communication terminal can calculate receiving weights $W_{MMSE,\,i}$ not only on the basis of the channel matrix of the downlink channel from the desired base station for the mobile communication terminal to the mobile communication terminal, and the precoding matrix generated at the desired base station for the mobile communication terminal, but also on the basis of channel matrices of downlink channels of signals coming into the mobile communication terminal transmitted from desired base stations for other mobile communication terminals in order to send the downlink signals to other mobile communication terminals, and precoding matrices generated at other base stations for other mobile communication terminals for downlink transmission to other mobile communication terminals. In SU-MIMO, desired base stations for other mobile terminals are different from the desired base station for the mobile communication terminal for which receiving weights are to be calculated.

The mobile communication terminal can estimate the product of the channel matrix of the downlink channel from the desired base station to mobile communication terminal and the precoding matrix thereof, on the basis of a reference signal, which will be described later. In order to use Equation (1), the mobile communication terminal should know or estimate channel matrices and precoding matrices with respect to signals transmitted to other mobile communication terminals, i.e., interfering signals.

In a case in which information on all downlink channels that may cause large interference cannot be estimated, it is possible to calculate reception weights $W_{MMSE,\,i}$ for a mobile communication terminal that receives signals by using Equation (2) below, as an alternative IRC reception technique.

$$W_{MMSE,i} = P_s(H_i W_{TX,i})^H (R_{yy,i}^{-1})^T \quad (2)$$

In Equation (2), superscript T indicates transposition. $R_{yy,i}$ is a covariance matrix of the received signal vector for the mobile communication terminal #i, and is calculated from Equation (3).

$$R_{yy,i} = \frac{1}{M}\sum_{m=1}^{M} y_i(m) * y_i(m^T) \quad (3)$$

In Equation (3), $y_i(m)$ is a vector of a signal received at the mobile communication terminal #i, in which m is the sample number (resource element number) of the received signal. Mobile communication terminal #i calculates the received signal vector $y_i(m)$ for each of receiving antennas of the mobile communication terminal #i. The sample number m is a combination of the number of the received subcarrier and the symbol number of the OFDM (Orthogonal Frequency Division Multiplexing) symbol. In Equation (3), the asterisk denotes conjugate, whereas T denotes transpose. M is the total number of samples used for averaging, and is freely determined. Thus, each mobile terminal processes vectors of samples of signals at respective receiving antennas of the mobile communication terminal, and averages the matrices obtained by the process, thereby obtaining the covariance matrix $R_{yy,i}$.

According to Equation (2), each mobile communication terminal can calculate the receiving weights $W_{MMSE,i}$ from the channel matrix of downlink channels from the desired base station for the mobile communication terminal to the mobile communication terminal, the precoding matrix for the mobile communication terminal generated at the desired base station, and received signal vectors. It is possible to estimate the product of the channel matrix of downlink channels from the desired base station to the mobile communication terminal and the precoding matrix thereof on the basis of the reference signal, which will be described later. Therefore, if Equation (2) is used, it is unnecessary to estimate channel matrices of interfering waves coming from interfering base stations for downlink signal transmission to other mobile communication terminals. However, for enhancing the ability to suppress interference by beams from other base stations, it is necessary to prepare many samples m (the number of resource elements) used for averaging in Equation (3).

In radio communication systems complying with LTE Release 10, different cell IDs are allocated to individual cells, i.e., individual base stations. Also, in Release 11, different cell IDs are allocated to individual base stations, except for remote radio heads (RRHs). For example, in the structure of FIG. 2, cell IDs 1, 2, and 3 are allocated to base stations 1, 2, and 3 (thus, cells 1a, 2a, and 3a), respectively. In FIG. 2, the base station 1 is the desired base station for the mobile communication terminal 10, whereas the base stations 2 and 3 are interfering base stations.

The mobile communication terminal 10 shown in FIG. 2 is informed of the cell ID of the desired base station 1, the number of transmitting antennas of the desired base station 1, the number of transmission layers transmitted from the desired base station 1 to the mobile communication terminal 10, and other information by control signals from the base station 1. However, in the radio system shown in FIG. 2 (radio system in which different cell IDs are allocated to all base stations), the mobile communication terminal 10 is not informed of cell IDs of interfering base stations. Therefore, it is difficult to conduct the IRC reception method in which information on the downlink channels from interfering base stations is estimated and used (i.e., the method for calculating receiving weights with the use of Equation (1)). This is because the mobile communication terminal 10 is not aware of cell IDs of interfering base stations, and therefore the terminal 10 cannot estimate directly information on the channels from interfering base stations. In an alternation, without knowing cell IDs of interfering base stations, it is possible to estimate blind information on the channels from interfering base stations, but in this case, accuracy of the calculated receiving weights are low.

Accordingly, in the following, another IRC reception method for calculating receiving weights with the use of Equation (2) will be discussed. As described above, in order to calculate receiving weights by Equation (2), a vector $y_i(m)$ of each sample (resource element) of the signal from each receiving antenna of the mobile communication terminal is processed, and the matrices obtained by this process are averaged in accordance with Equation (3), so that the covariance matrix $R_{yy,i}$ is obtained.

The samples of the received signal can be selected in one of two manners described below. The selection manners will be described with reference to FIGS. 3 and 4. FIGS. 3 and 4 show mapping of signals on a resource block in OFDMA downlink transmission. Reference symbol RB designates a single resource block, and each square designates a resource element that is a minimum resource unit defined by a single subcarrier and a single OFDM symbol. The ordinate denotes frequency (subcarrier), whereas the abscissa denotes time (OFDM symbol).

The sample number (resource element number) m is specified by k and l in which k is the received subcarrier number (i.e., subcarrier index), and l is the OFDM symbol number (i.e., OFDM symbol index). The received signal vectors $y_i(m)$ of each resource element can be expressed by $y_i(k, l)$.

As shown in FIG. 3, in a manner for selecting received signal samples, for each of multiple subcarriers allocated to downlink transmission from the desired base station to the mobile communication terminal, multiple resource elements including resource elements for the data signal (resource elements of OFDM symbol numbers 3 through 13) are selected. That is to say, resource elements of OFDM symbol numbers 0 through 2 that never include the data signal are excluded. Additionally, the reference signal arranged in OFDM symbol numbers 4, 7, 8, 9, 10, and 11 shown in FIG. 3 may be excluded because the reference signal is transmitted without multiplication by precoding. Then, received signal vectors $y_i(k, l)$ of these selected resource elements are obtained, and the matrices $y_i(k,l)*y_i(k,l)^T$ is calculated. Furthermore, the matrices are averaged for the respective subcarriers, so that the covariance matrix $R_{yy,i}$ is obtained for the respective subcarriers. Next, in accordance with Equation (2), for the respective subcarriers, receiving weights $W_{MMSE,i}$ is calculated. Thus, for the respective subcarriers, receiving weights are obtained.

As shown in FIG. 4, in another manner for selecting received signal samples, for a resource block, multiple resource elements including resource elements for the data signal (resource elements of OFDM symbol numbers 3 through 13) are selected. That is to say, resource elements of OFDM symbol numbers 0 through 2 that never include the data signal are excluded. Additionally, the reference signal arranged in OFDM symbol numbers 4, 7, 8, 9, 10, and 11 shown in FIG. 4 may be excluded because the reference signal is transmitted without multiplication by precoding. Then, received signal vectors $y_i(k, l)$ of these selected resource elements are obtained, and the matrices $y_i(k,l)*y_i(k,l)^T$ is calculated. Furthermore, the matrices are averaged over the single resource block, so that the covariance matrix $R_{yy,i}$ is obtained for this resource block. Next, in accordance with Equation (2), for this resource block, receiving weights $W_{MMSE, i}$ is calculated. Thus, for the single resource block, receiving weights are obtained.

PRIOR ART DOCUMENTS

Patent Documents

Patent Document 1: JP-A-2000-511370

Non-Patent Documents

Non-patent Document 1: R1-111031, 3GPP TSG RAN WG1 Meeting #64, Taipei, Taiwan, 21-25 Feb. 2011, Agenda item: 6.3.1.3, Source: Nokia, Nokia Siemens Networks, Title: "On advanced UE MMSE receiver modelling in system simulations", Document for: Discussion and Decision Non-patent Document 2: Lars Thiele at al, "On the Value of Synchronous Downlink MIMO-OFDMA Systems with Linear Equalizers", Fraunhofer Institute for Telecommunications, Heinrich-Hertz-Institut Einsteinufer 37, 10587 Berlin, Germany Non-patent Document 3: 3GPP TS 36.211 V10.0.0 (2010-12), 3rd Generation Partnership Project; Technical Specification Group Radio Access Network; Evolved Universal Terrestrial Radio Access (E-UTRA); "Physical channels and modulation", (Release 10), December 2010

SUMMARY OF THE INVENTION

In the above-described IRC reception method for calculating receiving weights with the use of Equation (2), accuracy of receiving weights calculated actually may be frequently low, and as a result, even if the mobile communication terminal separates the signal destined for the mobile communication terminal, the quality of the signal may be frequently low. The reason is assumed as follows:

In the sampling technique for respective subcarriers described above with reference to FIG. 3, because the number of samples are small, the calculated covariance matrix of received signal vectors may include an error. On the other hand, in the sampling technique for the entire resource block described above with reference to FIG. 4, the calculated covariance matrix of received signal vectors may also include an error due to the samples at a subcarrier of which the channel status is bad by frequency selective fading.

Especially, for a mobile communication terminal located at the center of a cell for which reception characteristic is supposed to be good in general, the deterioration of reception characteristic is a significant problem. Such a mobile communication terminal located at the center of a cell is less affected by interfering signals, so that execution of the IRC reception method offers only small merit in general. On the contrary, by executing the IRC reception method, such a mobile communication terminal located at the center of a cell will be significantly affected by the deterioration of reception characteristic.

Accordingly, the present invention provides a mobile communication terminal that can enjoy good reception characteristic regardless of whether it is located at the center or edge of a cell.

According to an aspect of the present invention, a mobile communication terminal for receiving downlink signals from a desired base station by orthogonal frequency division multiple access, includes: multiple receiving antennas for receiving electric wave; an interference rejection combining processor adapted for obtaining a received signal vector with regard to each of multiple resource elements from signals derived from electric wave received by the multiple receiving antennas, and adapted for calculating receiving weights so as to suppress influence to a desired beam of electric wave sent from the desired base station by other beams, on the basis of the received signal vectors; a non-interference-rejection receiving weight calculator adapted for calculating receiving weights so as not to suppress influence to the desired beam of electric wave sent from the desired base station by other beams; a signal separator adapted for separating a signal destined for the mobile communication terminal from signals destined for other mobile communication terminals among signals derived from electric wave received at the multiple receiving antennas; and an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal.

With such a structure, an interference rejection combining determiner determines whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal. A mobile communication terminal located at the center of a cell is less affected by interfering signals, so that interference rejection combining offers only small merit in general. On the contrary, interference rejection combining may have a negative effect on such a mobile communication terminal. However, since it is determined whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, if the mobile communication terminal is located at the center of a cell, the receiving weights calculated by the non-interference-rejection receiving weight calculator is used instead of the receiving weights calculated by the interference rejection combining processor for signal separation by the signal separator. Therefore, it is possible to ensure good reception quality. On the other hand, if the mobile communication terminal is located at the edge of a cell and is likely affected by interfering signals, the receiving weights calculated by the interference rejection combining processor are used for signal separation by the signal separator, so that it is possible to ensure good reception quality.

According to another aspect of the present invention, mobile communication terminal for receiving downlink signals from a desired base station by orthogonal frequency division multiple access, includes: multiple receiving antennas for receiving electric wave; an interference rejection combining processor adapted for obtaining a received signal vector with regard to each of multiple resource elements from signals derived from electric wave received by the multiple receiving antennas, and adapted for calculating receiving weights so as to suppress influence to a desired beam of electric wave sent from the desired base station by other beams, on the basis of the received signal vectors; a first signal separator adapted for separating a signal destined for the mobile communication terminal from signals destined for other mobile communication terminals among signals derived from electric wave received at the multiple receiving antennas, with the use of the receiving weights calculated by the interference rejection combining processor; a first demodulator adapted for demodulating the signal destined for the mobile communication terminal separated by the first signal separator; a first error decider adapted for deciding existence or non-existence of errors in the signal demodulated by the first demodulator; a non-interference-rejection receiving weight calculator adapted for calculating receiving weights so as not to suppress influence to the desired beam of electric wave sent from the desired base station by other beams; a second signal separator adapted for separating a signal destined for the mobile communication terminal from signals destined for other mobile communication terminals among signals derived from electric wave received at the multiple receiving antennas, with the use of the receiving weights calculated by the non-interference-rejection receiving weight calculator and without use of the receiving weights calculated by the interference rejection combining processor; a second demodulator adapted for demodulating the signal destined for the mobile communication terminal separated by the second signal separator; a second error decider adapted for deciding existence or non-existence of errors in the signal demodulated by the second demodulator; and an interference rejection combining determiner adapted for determining whether the signal demodulated by the first demodulator or the signal demodulated by the second demodulator should be output, on the basis of error decision by the first error decider and error decision by the second error decider.

With such a structure, the first demodulator demodulates the signal destined for the mobile communication terminal that was subjected to interference rejection combining, and the first error decider decides existence or non-existence of errors in the signal demodulated by the first demodulator. On the other hand, the second demodulator demodulates the signal destined for the mobile communication terminal that was not subjected to interference rejection combining, and the second error decider decides existence or non-existence of errors in the signal demodulated by the second demodulator. On the basis of error decision by the first error decider and error decision by the second error decider, the interference rejection combining determiner determines whether the signal demodulated by the first demodulator or the signal demodulated by the second demodulator should be output. A mobile communication terminal located at the center of a cell is less affected by interfering signals, so that interference rejection combining offers only small merit in general. On the contrary, interference rejection combining may have a negative effect on such a mobile communication terminal. However, since it is determined whether the signal demodulated by the first demodulator or the signal demodulated by the second demodulator should be output, on the basis of error decision by the first error decider and error decision by the second error decider, if the mobile communication terminal is located at the center of a cell, the signal demodulated by the second demodulator that is not affected by the receiving weights for interference rejection combining is output. Therefore, it is possible to ensure good reception quality. On the other hand, if the mobile communication terminal is located at the edge of a cell and is likely affected by interfering signals, the signal demodulated by the first demodulator that is improved by receiving weights for interference rejection combining, and it is possible to ensure good reception quality.

DESCRIPTION OF EMBODIMENTS

With reference to the accompanying drawings, various embodiments according to the present invention will be described.

Figure 1:
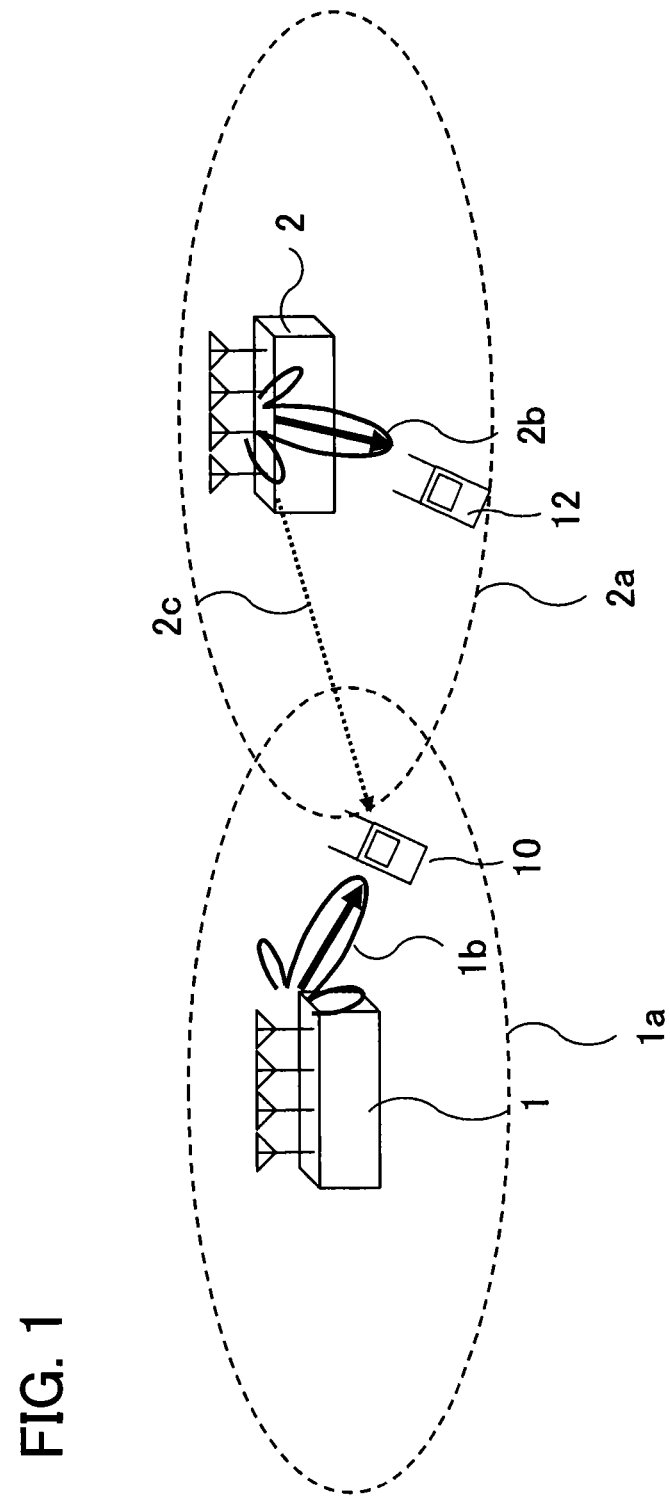
FIG. 1 is a view showing mobile communication terminal receiving an interfering beam from an interfering base station.
Figure 2:
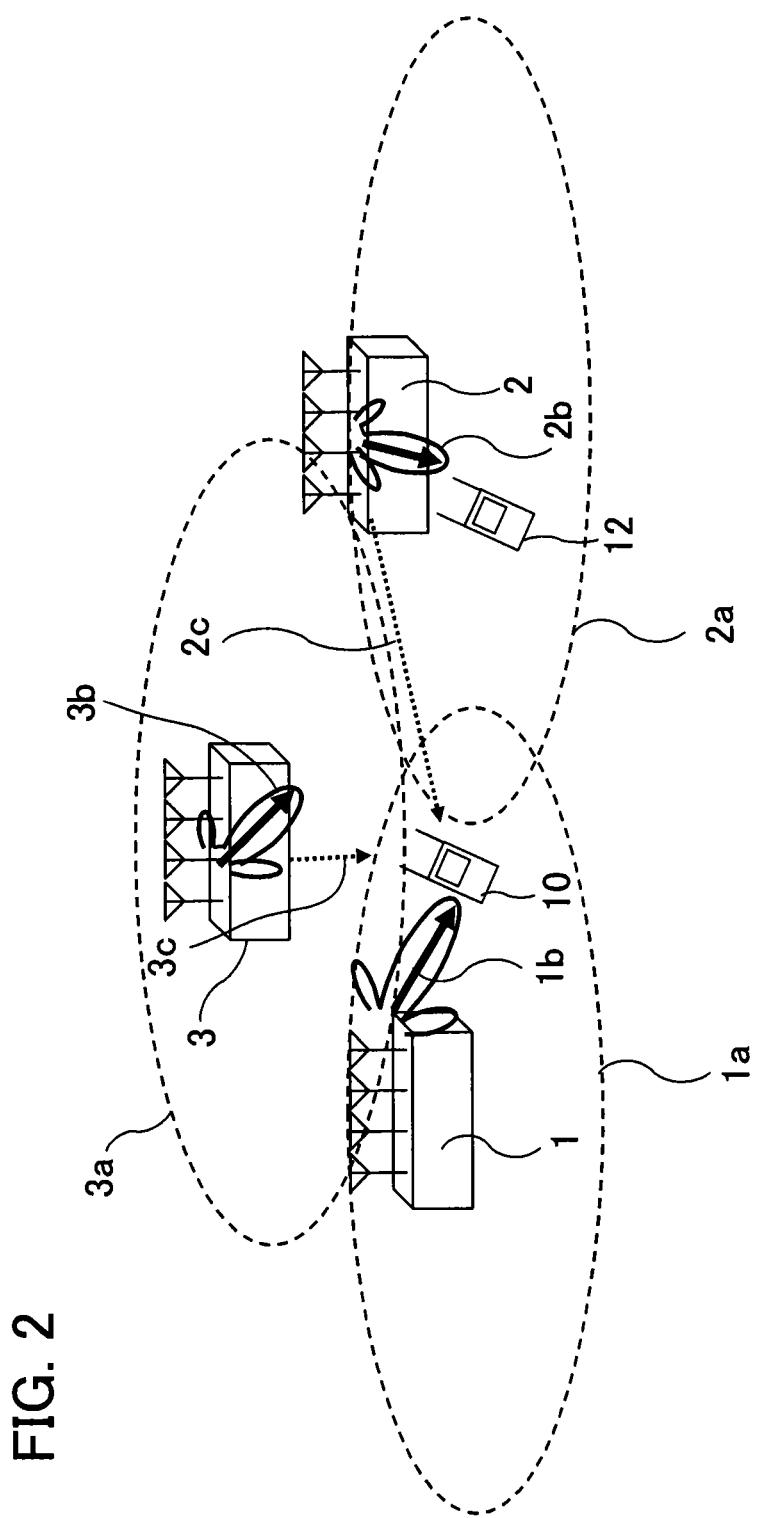
FIG. 2 is a view showing a radio communication system according to embodiments of the present invention.

The mobile communication terminal according to the present invention is used in a radio communication system shown in FIG. 2. Different cell IDs are allocated to the macro base stations 1, 2, and 3, and these base stations are asynchronous.

Each of the mobile communication terminals 10 and 12 is, for example, a mobile phone (UE (user equipment) in LTE). In FIG. 2, the base station 1 is the desired base station for the mobile communication terminal 10. The mobile communication terminal 10 is located near the boundary of the cell 1a of the desired base station 1, especially, located near the cells 2a and 3a of interfering base stations 2 and 3, and may receive beams 2b and 3b from interfering base stations 2 and 3. A part of the beam 2b, i.e., a part of a beam for downlink channels for other mobile communication terminals (for example, a mobile communication terminal 12) causes an interfering signal 2c for the mobile communication terminal 10, and a part of the beam 3b causes an interfering signal 3c for the mobile communication terminal 10. On the other hand, the base station 2 is the desired base station for the mobile communication terminal 12. The mobile communication terminal 12 is located at the center of the cell 2a of the desired base station 2, and is less affected by beams 1b and 3b from interfering base stations 1 and 3. Each of the mobile communication terminals 10 and 12 is adapted for both MIMO and SIMO.

First Embodiment

Figure 5:
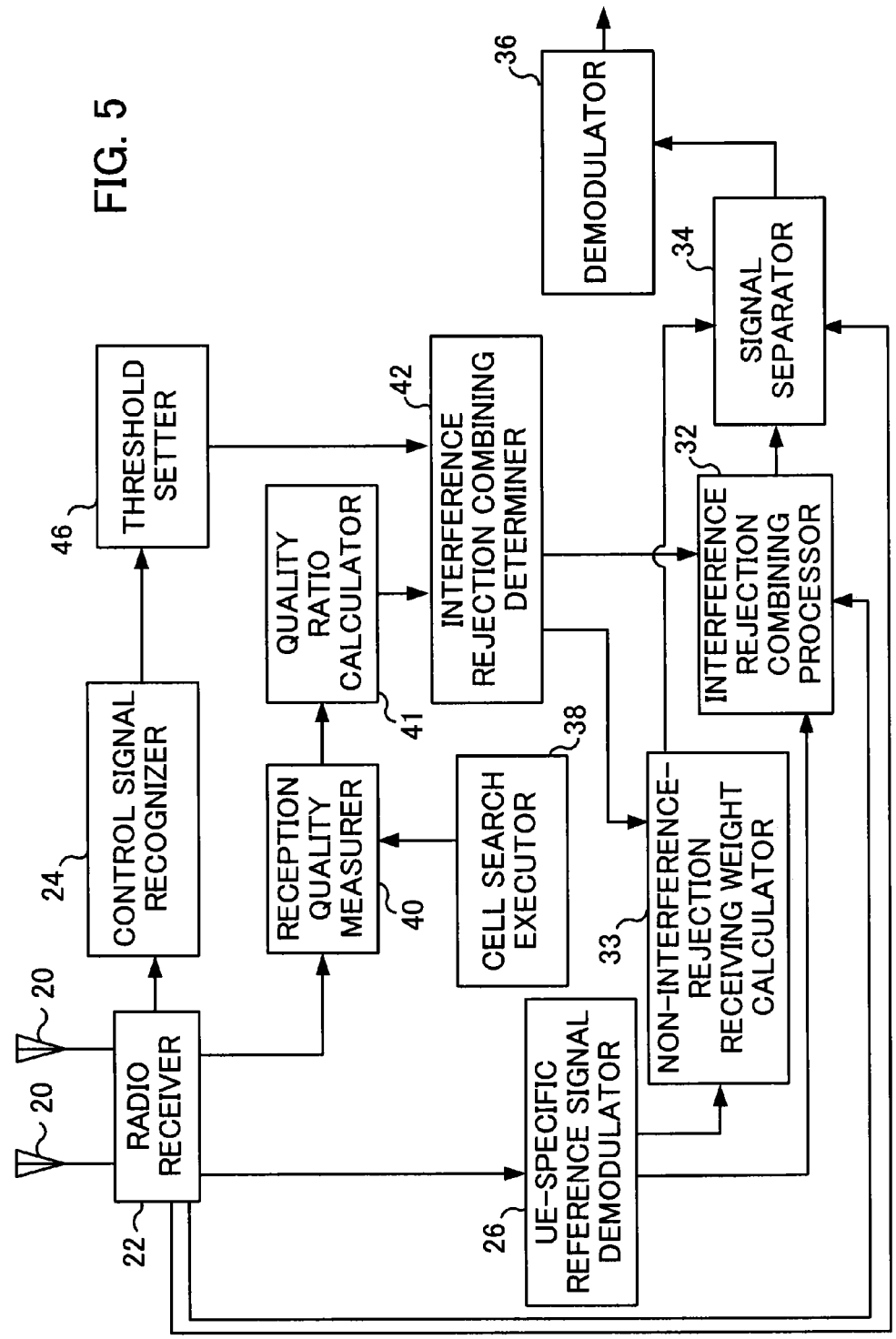
FIG. 5 is a view showing a radio communication system according to a first embodiment and a second embodiment of the present invention.

FIG. 5 is a block diagram showing the structure of the mobile communication terminal according to the first embodiment of the present invention. FIG. 5 shows only parts involved in signal reception and does not show other parts. As shown in FIG. 5, each mobile communication terminal includes multiple receiving antennas 20 for receiving electric wave, and a radio receiver 22 that is a reception circuit applied to OFDMA for converting electric wave received at the receiving antennas 20 to an electric signal.

Furthermore, the mobile communication terminal includes a control signal recognizer 24, a UE-specific reference signal demodulator 26, an interference rejection combining processor 32, a non-interference-rejection receiving weight calculator 33, a signal separator 34, a demodulator 36, a cell search executor 38, a quality ratio calculator 41, an interference rejection combining determiner 42, a control signal recognizer 24, and a threshold setter 46. These structural elements are functional blocks that are realized by that a CPU (not shown) in the mobile communication terminal executes a computer program and functions in accordance with the computer program. Furthermore, the mobile communication terminal includes a reception quality measurer 40.

The control signal recognizer 24 recognizes control signals sent from the desired base station among signals output from the radio receiver 22. The control signals indicate, for example, the cell ID of the desired base station, the number of transmitting antennas of the desired base station, the number of transmission layers (transmission streams) sent to the mobile communication terminal from the desired base station, and the UE-specific reference signal layer numbers representing the layers on which the UE-specific reference signals to be processed by the mobile communication terminal are transmitted.

The UE-specific reference signal demodulator 26 demodulates the UE-specific reference signal for the mobile communication terminal from signals output from the radio receiver 22 on the basis of the UE-specific reference signal layer number signaled by the desired base station and recognized by the control signal recognizer 24, the cell ID of the desired base station signaled by the desired base station, etc. If multiple UE-specific reference signal layer numbers are signaled from the desired base station and are recognized by the control signal recognizer 24, the UE-specific reference signal demodulator 26 demodulates multiple desired UE-specific reference signals specified by these multiple numbers.

The interference rejection combining processor recognizes the product $H_i W_{TX, i}$ of a channel impulse matrix (channel matrix) $H_i$ and a precoding matrix $W_{TX, i}$. The channel impulse matrix is the channel impulse matrix of the desired downlink beam from the desired base station to the mobile communication terminal and specified in the UE-specific reference signal demodulated by the UE-specific reference signal demodulator 26. The precoding matrix is a precoding matrix generated by the desired base station in order to transmit the desired beam to the mobile communication terminal.

The desired base station can inform the mobile terminal of the product of the channel matrix and the precoding matrix by means of the UE-specific reference signal. The mobile communication terminal calculates the channel matrix with the use of a reference signal (cell-specific reference signal or channel state information reference signal) different from the UE-specific reference signal, and feeds it back to the desired base station for the mobile communication terminal. On the basis of the desired channel matrix fed back from the mobile communication terminal, the desired base station calculates the desired precoding matrix, and signals the product of the desired channel matrix and the desired precoding matrix to the mobile terminal. Alternatively, the mobile communication terminal may calculate the desired precoding matrix on the basis of the channel matrix calculated by the mobile communication terminal itself, and may feed the desired precoding matrix back to the desired base station. Alternatively, on the basis of the channel matrix calculated by the mobile communication terminal itself, the mobile communication terminal may select one or multiple matrices from among the precoding matrices (codebooks) commonly held in mobile communication terminals and base stations, and may feed the indexes of matrices back to the desired base station. Alternatively, in a system in which base stations calculates precoding matrices without use of information on channel matrix, and so on, the mobile communication terminal does not need to feed the channel matrix, the precoding matrix, index information, etc. back.

Figure 3:
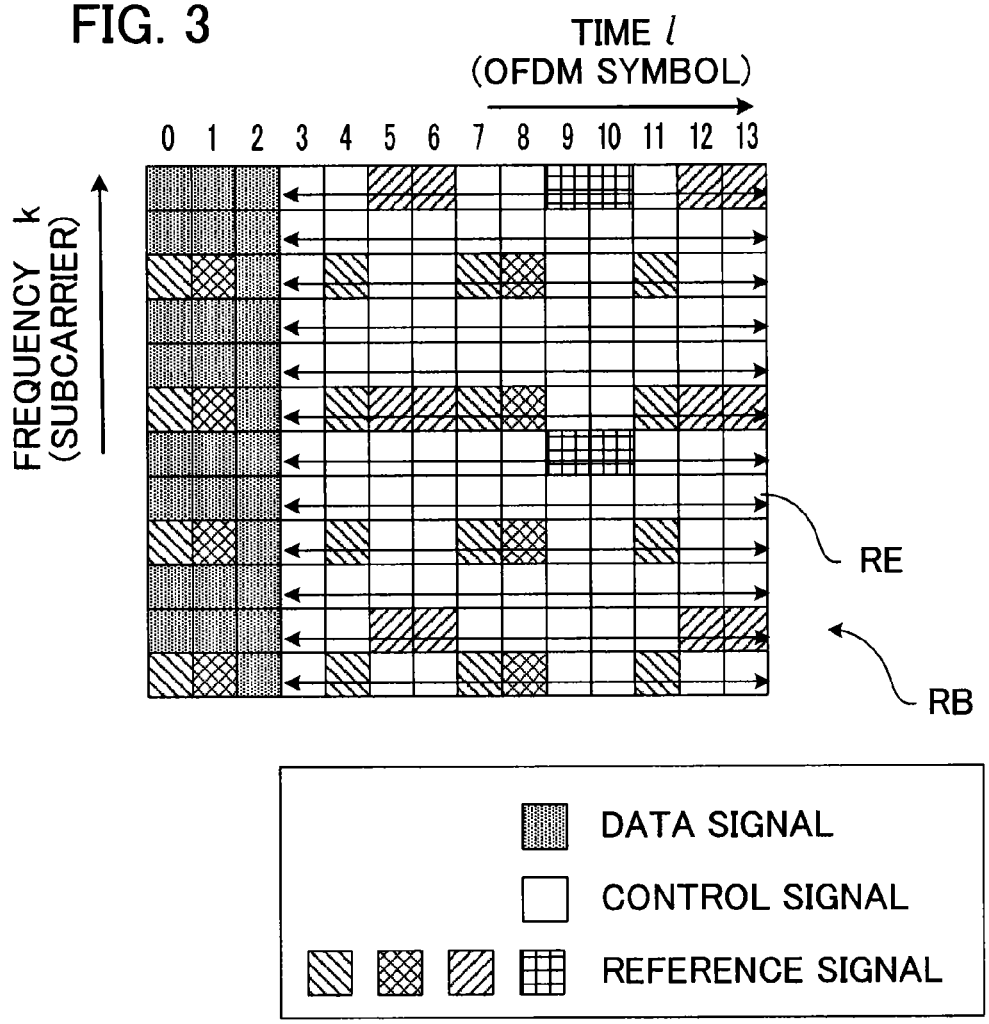
FIG. 3 is a view showing mapping of signals on a resource block for describing a sampling technique for interference rejection combining.
Figure 4:
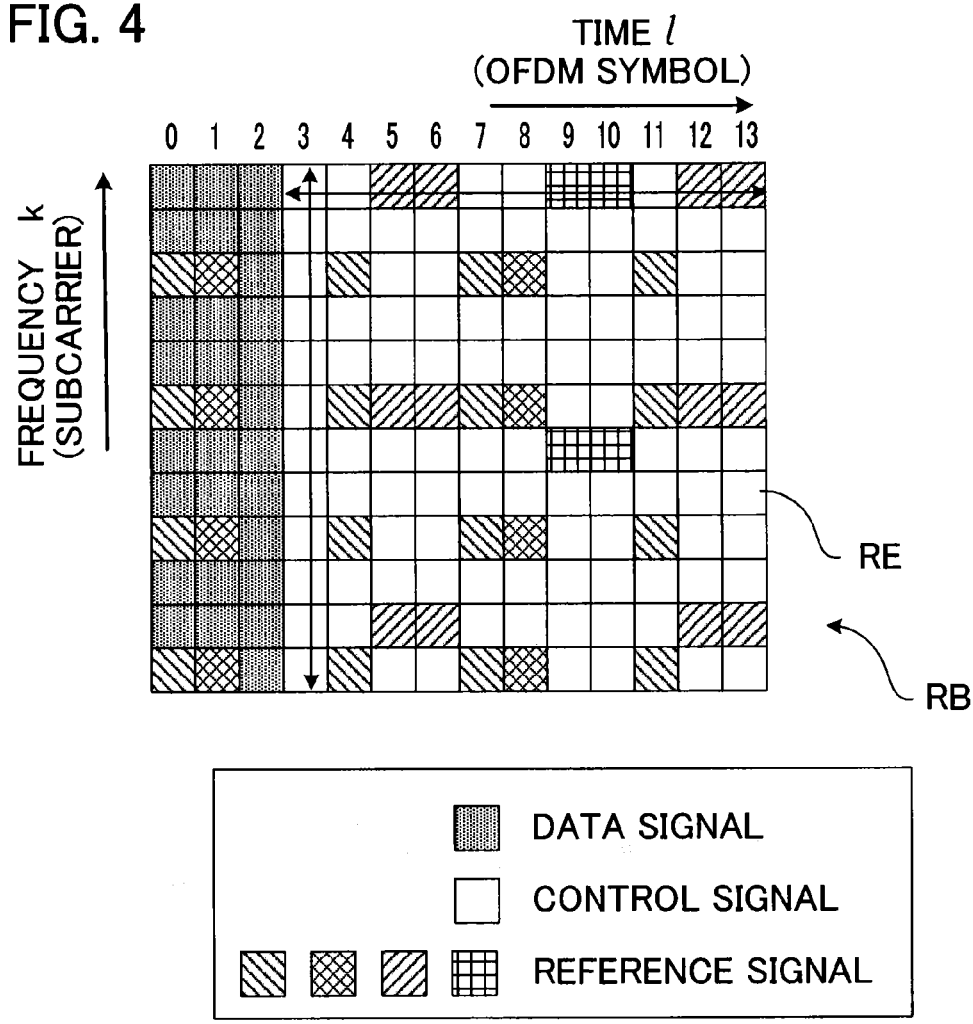
FIG. 4 is a view showing mapping of signals on a resource block for describing another sampling technique for interference rejection combining.

The interference rejection combining processor 32 obtains received signal vectors $y_i(k, l)$, i.e., $y_i(m)$ regarding multiple resource elements from signals derived from electric wave received by the multiple receiving antennas and output from the radio receiver 2. As described with reference to FIGS. 3 and 4, the samples (resource elements) for obtaining received signal vectors are multiple resource elements including resource elements for the data signal (resource elements of OFDM symbol numbers 3 through 13). Additionally, the reference signal arranged in OFDM symbol numbers 4, 7, 8, 9, 10, and 11 shown in FIGS. 3 and 4 may be excluded because the reference signal is transmitted without multiplication by precoding.

Furthermore, on the basis of the product of the channel matrix and the precoding matrix and on the basis of the received signal vectors, the interference rejection combining processor 32 calculates the receiving weights $W_{MMSE, i}$ so as to suppress influence to the desired beam sent from the desired base station by other beams. More specifically, the interference rejection combining processor 32 executes IRC reception with the use of Equation (2) for calculating receiving weights. The transmission power $P_s$ of the desired base station that is used in Equation (2) is estimated by a known technique.

The non-interference-rejection receiving weight calculator 33 in the mobile communication terminal recognizes the product $H_i W_{TX, i}$ of the channel impulse matrix (channel matrix) $H_i$ of the desired downlink beam from desired base station to the mobile communication terminal and the precoding matrix $W_{TX, i}$ generated at the desired base station for sending the desired beam to the mobile communication terminal, in which the channel impulse matrix is specified in the UE-specific reference signal demodulated by the UE-specific reference signal demodulator 26.

The non-interference-rejection receiving weight calculator 33 calculates receiving weights $W_i$ that can be derived by MMSE (minimum mean-square-error) algorithm, for example, in accordance with the equation be low.)

$$W_i = P_s (H_i W_{TX,i})^H (P_s (H_i W_{TX,i})(H_i W_{TX,i})^H + \sigma_i^2 I)^{-1}$$

Alternatively, the non-interference-rejection receiving weight calculator 33 may calculate the receiving weights that are based on maximum ratio combining (MRC) in accordance with the equation below.

$$W_i = P_s(H_i W_{TX,i})^H$$

Using the receiving weights calculated by the interference rejection combining processor 32, the signal separator 34 separates a signal destined for the mobile communication terminal from signals destined for other mobile communication terminals among signals output from the radio receiver 22. However, under control of the interference rejection combining determiner 42, the interference rejection combining processor 32 may omit calculating the receiving weights. When the interference rejection combining processor 32 does not calculate the receiving weights, the signal separator 34 separates a signal destined for the mobile communication terminal from signals destined for other mobile communication terminals among signals output from the radio receiver 22 with the use of the receiving weights calculated by the non-interference-rejection receiving weight calculator 33. The demodulator 36 demodulates and decodes the signal destined for the mobile communication terminal separated by the signal separator 40 to obtain a data signal.

The interference rejection combining determiner 42 determines whether the interference rejection combining processor should calculate the calculation of receiving weights or not, on the basis of an index representing a relationship between reception quality of a downlink transmission signal from the desired base station to the mobile communication terminal and reception quality of an interfering signal sent from another base station and received by the mobile communication terminal. In this embodiment, as the index for this purpose, a ratio of reception qualities of synchronization signals sent from different base stations and received by the mobile communication terminal at the cell search.

The cell search executor 38 executes the cell search at the power-on or other predetermined momentums. The cell search executor 38 determines a desired base station among different base stations on the basis of synchronization signals sent from different base stations and received by the mobile communication terminal, the synchronization signals facilitating the mobile communication terminal to search the desired base station to which the mobile communication terminal should connect. The procedure of the cell search is known.

The reception quality measurer 40 measures the reception qualities of the synchronization signals synchronization signals sent from different base stations and received by the mobile communication terminal at the cell search. The quality ratio calculator 41 calculates the ratio of the reception quality of the signal from the desired base station (that is decided at the cell search) measured by the reception quality measurer 40 to the reception quality of a signal from another base station measured by the reception quality measurer 40. In other words, the quality ratio calculator 41 calculates the quality ratio $R_Q$ in accordance with the equation below.

$$R_Q = Q_D / Q_I$$

where $Q_D$ is the reception quality of the signal from the desired base station, and $Q_I$ is the reception quality of the signal from another base station, i.e., the interfering base station.

The interference rejection combining determiner 42 compares the quality ratio $R_Q$ calculated by the quality ratio calculator 41 with a threshold $Th_R$. If $R_Q < Th_R$, the interference rejection combining determiner 42 determines to cause the interference rejection combining processor 32 to calculate the receiving weights, deactivates the non-interference-rejection receiving weight calculator 33, and activates the interference rejection combining processor 32. If $R_Q > Th_R$, the interference rejection combining determiner 42 determines not to cause the interference rejection combining processor 32 to calculate the receiving weights, deactivates the interference rejection combining processor 32, and activates the non-interference-rejection receiving weight calculator 33.

For example, let us assume that the reception quality of the signal from the desired base station 1 at the mobile communication terminal 10 in FIG. 2 is $Q_{11}$, and that the reception quality of the signal from the interfering base station 3 at the mobile communication terminal 10 is $Q_{31}$. If $Q_{11}/Q_{31} < Th_R$, the interference rejection combining determiner 42 determines to cause the interference rejection combining processor 32 to calculate the receiving weights, deactivates the non-interference-rejection receiving weight calculator 33, and activates the interference rejection combining processor 32.

On the other hand, let us assume that the reception quality of the signal from the desired base station 2 at the mobile communication terminal 12 in FIG. 2 is $Q_{22}$, and that the reception qualities of the signals from the interfering base stations 1 and 3 at the mobile communication terminal 12 are $Q_{12}$ and $Q_{32}$, respectively. If $Q_{22}/Q_{12} > Th_R$ and $Q_{22}/Q_{32} > Th_R$, the interference rejection combining determiner determines not to cause the interference rejection combining processor 32 to calculate the receiving weights, deactivates the interference rejection combining processor 32, and activates the non-interference-rejection receiving weight calculator 33.

Therefore, if the mobile communication terminal is located at the center of a cell, receiving weights for interference rejection combining are not calculated, and instead, the receiving weights calculated by the non-interference-rejection receiving weight calculator 33 are used for signal separation at the signal separator 34. Accordingly, it is possible to ensure good reception quality. On the other hand, if the mobile communication terminal is located at the edge of a cell and is likely affected by interfering signals, receiving weights for interference rejection combining are calculated, so that these receiving weights are used for signal separation at the signal separator 34. Accordingly, it is possible to ensure good reception quality.

In this embodiment, the mobile communication terminal includes a threshold setter 46 that sets the threshold $Th_R$ at a lower level if the desired base station is a macro-cell base station, and sets the threshold $Th_R$ at a higher level if the desired base station is not a macro-cell base station. The above-mentioned base stations 1, 2, and 3 are macro-cell base stations each having large transmission power ability and each having a broad cell (macro cell) of which the radius is from several hundred meters to several ten kilometers.

Figure 6:
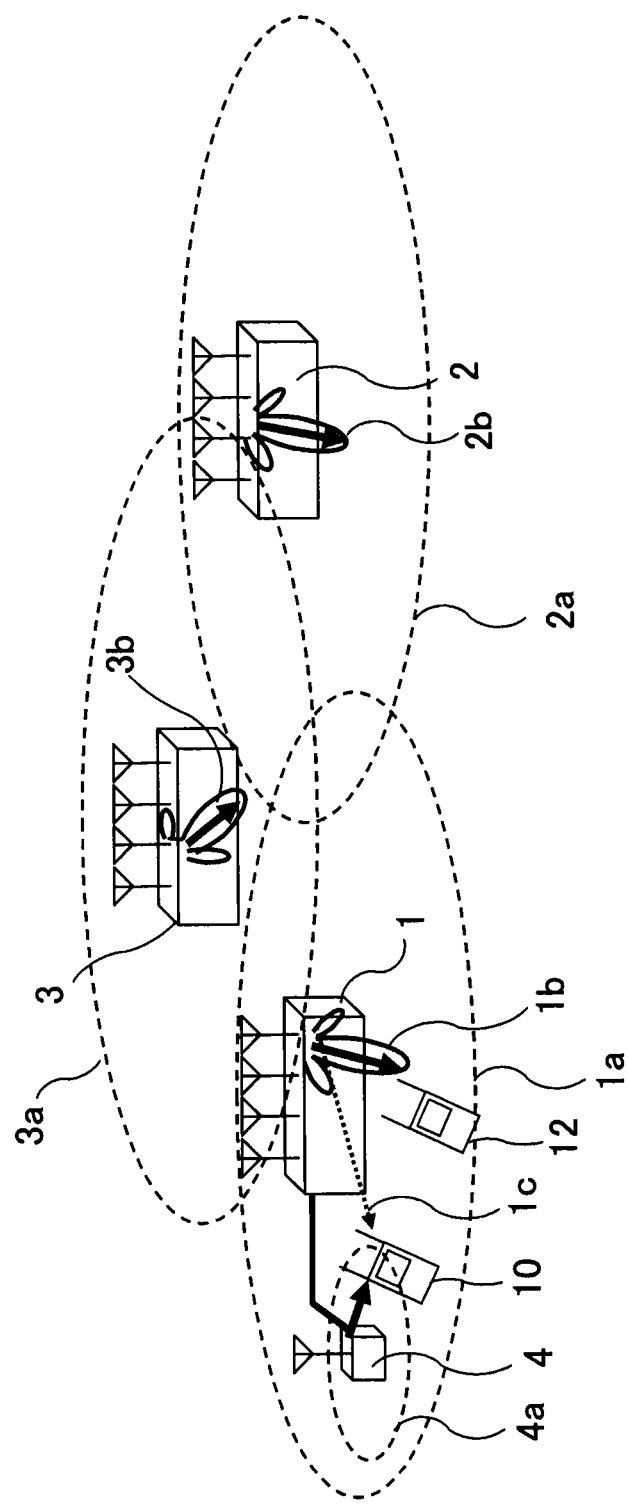
FIG. 6 is a view showing another radio communication system according to embodiments of the present invention.

Small base stations with small transmission power ability other than the macro-cell base station can be, for example, classified into a pico-cell base station with a cell having a radius from several meters to several ten meters, a micro-cell base station with a cell having a radius from several ten meters to several hundred meters, and a femto-cell base station with a cell having a radius of several meters. These small base stations are connected with macro-cell base stations by cable, such as optical fibers. For example, as shown in FIG. 6, the small base station 4 is connected with the macro-cell base station 1 via cable. However, the small base station 4 is not synchronized with the macro-cell base station 1.

The mobile communication terminal 10 shown in FIG. 6 is located in the cell 4a of the small base station 4. In this case, the small base station 4 is the desired base station for the mobile communication terminal 10, whereas the macro-cell base station 1 to which the small base station 4 is connected is the interfering base station for the mobile communication terminal 10. Transmission power of the macro-cell base station 1 is much higher than that of the small base station 4, so that the mobile communication terminal 10 is significantly affected by interference by the beam 1b from the macro-cell base station 1, i.e., the beam for a downlink channel for another mobile communication terminal (for example, the mobile communication terminal 12).

Accordingly, if the desired base station for the mobile communication terminal is a small base station, the threshold setter 46 sets the threshold $Th_R$ at a higher level to increase opportunities in which the interference rejection combining processor 32 is activated. On the other hand, if the desired base station for the mobile communication terminal is a macro-cell base station, the threshold setter 46 sets the threshold $Th_R$ at a lower level to decrease opportunities in which the interference rejection combining processor 32 is activated.

More specifically, the threshold setter 46 sets the threshold $Th_R$ on the basis of the cell ID signaled from the desired base station to the mobile communication terminal. As described above, the control signal recognizer 24 recognizes the control signal received from the desired base station among signals output from the radio receiver 22, the control signal indicating the cell ID of the source base station that has sent the control signal. By identifying the cell ID, it is possible to determine whether the source base station is a macro-cell base station or not. On the basis of the determination, the threshold setter 46 sets the threshold $Th_R$.

Second Embodiment

The structure of a mobile communication terminal according to a second embodiment of present invention is the same as that of the first embodiment that has been described with reference to FIG. 5. In the following, characteristics of the second embodiment that differ from the first embodiment will be described in detail.

At the cell search, the reception quality measurer 40 measures reception qualities of at least three synchronization signals sent from different base stations and received by the mobile communication terminal. The quality ratio calculator 41 calculates a ratio of the reception quality of the signal from the desired base station (that is decided at the cell search) measured by the reception quality measurer 40 to a reception quality of another signal from each of at least two base stations measured by the reception quality measurer 40. In other words, the quality ratio calculator 41 calculates multiple the quality ratio $R_Q$ in accordance with the equation below.

$$R_Q = Q_D/Q_I$$

where $Q_D$ is the reception quality of the signal from the desired base station, and $Q_I$ is the reception quality of the signal from another base station, i.e., an interfering base station.

The interference rejection combining determiner 42 compares each quality ratio $R_Q$ calculated by the quality ratio calculator 41 with a threshold $Th_R$. If the number of the quality ratios $R_Q$ that are less than the threshold ($R_Q < Th_R$) is equal to or greater than a predetermined number (for example, 2), the interference rejection combining determiner 42 determines to cause the interference rejection combining processor 32 to calculate the receiving weights, deactivates the non-interference-rejection receiving weight calculator 33, and activates the interference rejection combining processor 32. If the number of the quality ratios $R_Q$ that are less than the threshold ($R_Q < Th_R$) is less than the predetermined number, the interference rejection combining determiner 42 determines not to cause the interference rejection combining processor 32 to calculate the receiving weights, deactivates the interference rejection combining processor 32, and activates the non-interference-rejection receiving weight calculator 33.

Figure 7:
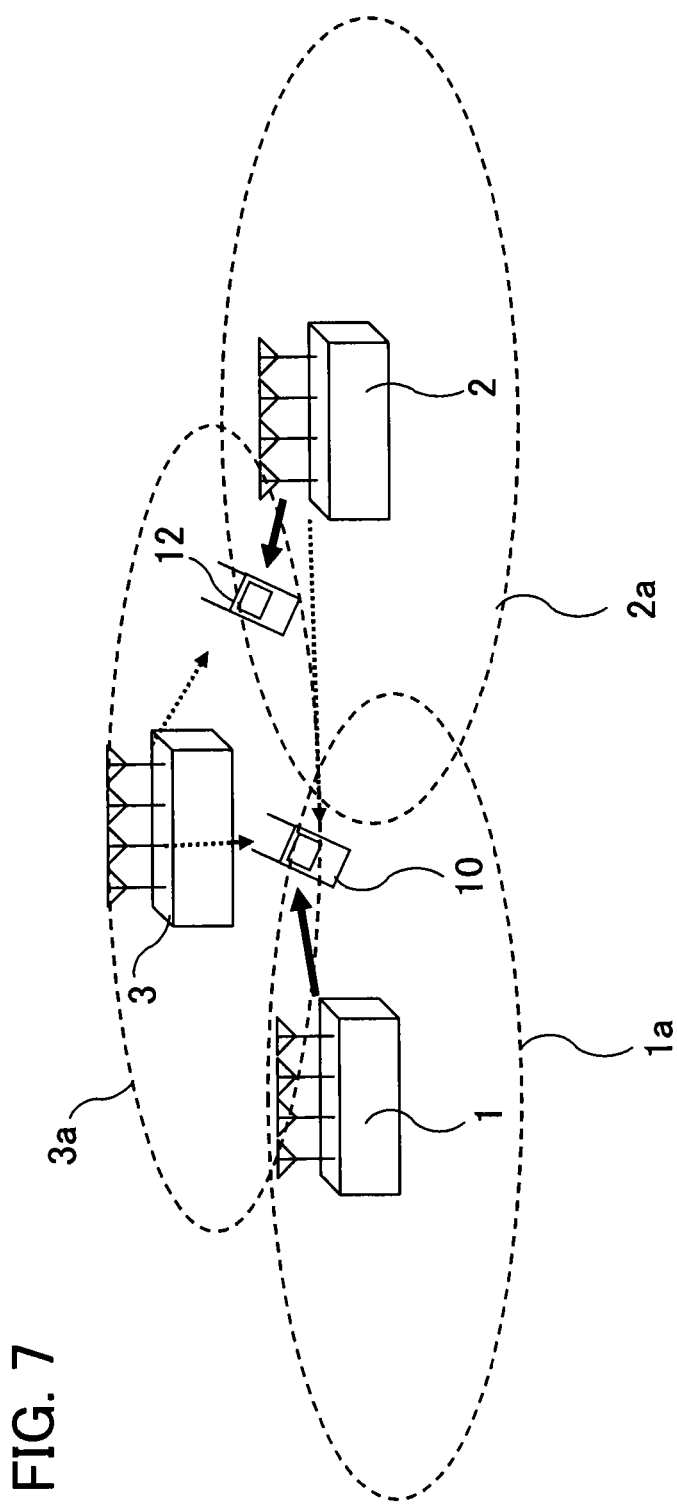
FIG. 7 is view showing a radio communication system according to embodiments of the present invention.

For example, let us assume that the reception quality of the signal from the desired base station 1 at the mobile communication terminal 10 in FIG. 7 is $Q_{11}$, that the reception quality of the signal from the interfering base station 2 at the mobile communication terminal 10 is $Q_{21}$, and that the reception quality of the signal from the interfering base station 3 at the mobile communication terminal 10 is $Q_{31}$.

If $Q_{11}/Q_{21} < Th_R$ and $Q_{11}/Q_{31} < Th_R$, the number of the quality ratios $R_Q$ that are less than the threshold $Th_R$ is the predetermined number, 2. In this case, the interference rejection combining determiner 42 determines to cause the interference rejection combining processor 32 to calculate the receiving weights, deactivates the non-interference-rejection receiving weight calculator 33, and activates the interference rejection combining processor 32.

On the other hand, let us assume that the reception quality of the signal from the desired base station 2 at the mobile communication terminal 12 in FIG. 7 is $Q_{22}$, and that the reception qualities of the signals from the interfering base stations 1 and 3 at the mobile communication terminal 12 are $Q_{12}$ and $Q_{32}$, respectively.

If $Q_{22}/Q_{12} > Th_R$ and $Q_{22}/Q_{32} < Th_R$, the interference rejection combining determiner 42 determines not to cause the interference rejection combining processor 32 to calculate the receiving weights, deactivates the interference rejection combining processor 32, and activates the non-interference-rejection receiving weight calculator 33.

Therefore, in this embodiment, if the mobile communication terminal is significantly affected by interference from multiple interfering base stations and the number of significantly interfering base stations is equal to or greater than the predetermined number (for example, 2), receiving weights for interference rejection combining are calculated, so that it is possible to ensure good reception quality. If the number of interfering base stations is less than the predetermined number, receiving weights for interference rejection combining are not calculated, so that load for calculating the receiving weights can be reduced.

The above-mentioned predetermined number can be set appropriately, for example, in accordance with experiments for investigating a relationship between the number of interfering base stations and the outcome of interference rejection combining. The predetermined number may be 1.

Third Embodiment

Figure 8:
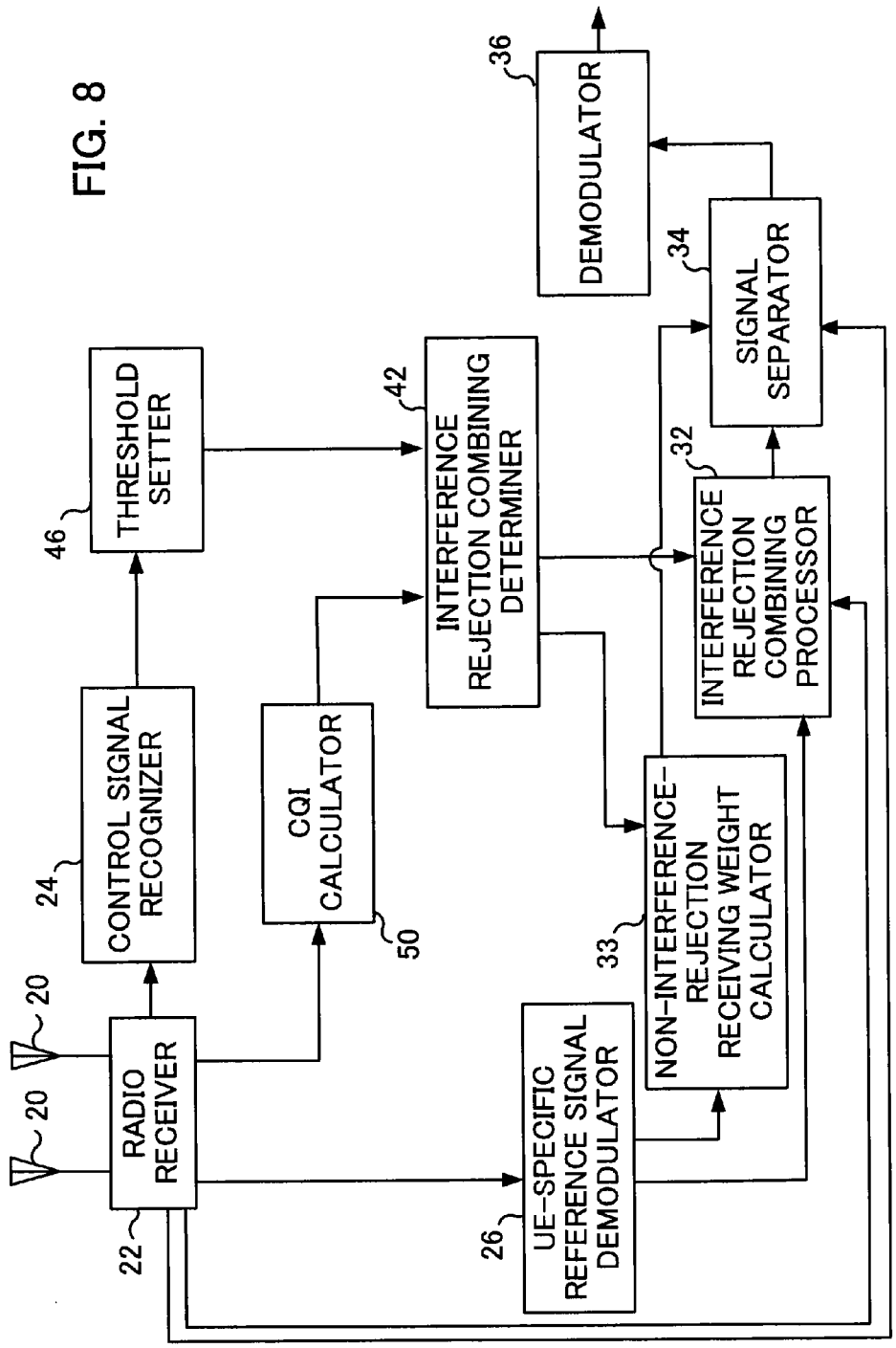
FIG. 8 is a block diagram showing the structure of a mobile communication terminal according to a third embodiment of the present invention.

FIG. 8 is a block diagram showing the structure of a mobile communication terminal according to a third embodiment of the present invention. FIG. 8 shows only parts involved in signal reception and does not show other parts. In FIG. 8, the same reference symbols are used to identify elements commonly used in the first embodiment in FIG. 5, and these elements will not be described in detail.

The mobile communication terminal according to the third embodiment includes a channel quality indicator (CQI) calculator 50 for calculating a channel quality indicator on the basis of the power of the signal received from the desired base station and the power of the interfering signal. The CQI may be any one of the SNR (signal-to-noise ratio), the SIR (signal-to-interference ratio), the SINR (signal-to-interference-plus-noise ratio), and the SDNR (signal-to-distortion-plus-noise ratio).

The interference rejection combining determiner 42 compares the CQI calculated by the CQI calculator 50 with a threshold $Th_C$. If the CQI is less than the threshold $Th_C$, the interference rejection combining determiner 42 determines to cause the interference rejection combining processor 32 to calculate the receiving weights, deactivates the non-interference-rejection receiving weight calculator 33, and activates the interference rejection combining processor 32. If the CQI is greater than the threshold $Th_C$, the interference rejection combining determiner 42 determines not to cause the interference rejection combining processor 32 to calculate the receiving weights, deactivates the interference rejection combining processor 32, and activates the non-interference-rejection receiving weight calculator 33. For example, if the CQI calculated in the mobile communication terminal 10 shown in FIG. 2 is less than the threshold $Th_C$, the interference rejection combining determiner 42 determines to cause the interference rejection combining processor 32 to calculate the receiving weights, deactivates the non-interference-rejection receiving weight calculator 33, and activates the interference rejection combining processor 32. If the CQI calculated in the mobile communication terminal 10 shown in FIG. 2 is greater than the threshold $Th_C$, the interference rejection combining determiner 42 determines not to cause the interference rejection combining processor 32 to calculate the receiving weights, deactivates the interference rejection combining processor 32, and activates the non-interference-rejection receiving weight calculator 33.

Therefore, if the mobile communication terminal is located at the center of a cell, receiving weights for interference rejection combining are not calculated, and instead, the receiving weights calculated by the non-interference-rejection receiving weight calculator 33 are used for signal separation at the signal separator 34. Accordingly, it is possible to ensure good reception quality. On the other hand, if the mobile communication terminal is located at the edge of a cell and is likely affected by interfering signals, receiving weights for interference rejection combining are calculated, so that these receiving weights are used for signal separation at the signal separator 34. Accordingly, it is possible to ensure good reception quality.

In this embodiment, the CQI calculator 50 may calculate the CQI for each of multiple subcarriers allocated to downlink transmission from the desired base station to the mobile communication terminal. In this case, the interference rejection combining processor 32 calculates the receiving weights for each of multiple subcarriers allocated to downlink transmission from the desired base station to the mobile communication terminal. The interference rejection combining processor 32 calculates the receiving weights for each of the multiple subcarriers or the receiving weights for each resource block including these subcarriers as described with reference to FIG. 3 or 4. In this case, the interference rejection combining determiner 42 compares the CQI for each of the multiple subcarriers calculated by the CQI calculator 50 with the threshold $Th_C$. The interference rejection combining determiner 42 determines to cause the interference rejection combining processor 32 to calculate the receiving weights for some subcarriers in which the CQI is less than the threshold $Th_C$. The interference rejection combining determiner 42 determines not to cause the interference rejection combining processor 32 to calculate the receiving weights, and to cause the non-interference-rejection receiving weight calculator 33 to calculate the receiving weights for other subcarriers in which the CQI is greater than the threshold. Thus, for some subcarriers, a data signal that was subjected to interference rejection by the receiving weights is demodulated by the demodulator 36, whereas a data signal that was not subjected to interference rejection by the receiving weights is demodulated by the demodulator 36 for other subcarriers.

Alternatively, the CQI calculator 50 may calculate the CQI for a subband including the multiple subcarriers allocated to downlink transmission from the desired base station to the mobile communication terminal. In this case, the interference rejection combining processor 32 calculates the receiving weights for a resource block including the multiple subcarriers allocated to downlink transmission from the desired base station to the mobile communication terminal. The interference rejection combining processor 32 calculates the receiving weights for each of the multiple subcarriers or the receiving weights for each resource block including these subcarriers as described with reference to FIG. 3 or 4. In this case, the interference rejection combining determiner 42 compares the CQI for the subband calculated by the CQI calculator 50 with the threshold $Th_C$. The interference rejection combining determiner 42 determines to cause the interference rejection combining processor 32 to calculate the receiving weights if the CQI for the subband is less than the threshold $Th_C$. The interference rejection combining determiner 42 determines not to cause the interference rejection combining processor 32 to calculate the receiving weights, and to cause the non-interference-rejection receiving weight calculator 33 to calculate the receiving weights if the CQI is greater than the threshold.

In this embodiment, if the desired base station for the mobile communication terminal is a small base station, the threshold setter 46 sets the threshold $Th_C$ at a higher level to increase opportunities in which the interference rejection combining processor 32 is activated. On the other hand, if the desired base station for the mobile communication terminal is a macro-cell base station, the threshold setter 46 sets the threshold $Th_C$ at a lower level to decrease opportunities in which the interference rejection combining processor 32 is activated. As similar to the first and second embodiments, the threshold setter 46 sets the threshold $Th_C$ on the basis of the cell ID signaled from the desired base station to the mobile communication terminal.

Fourth Embodiment

Figure 9:
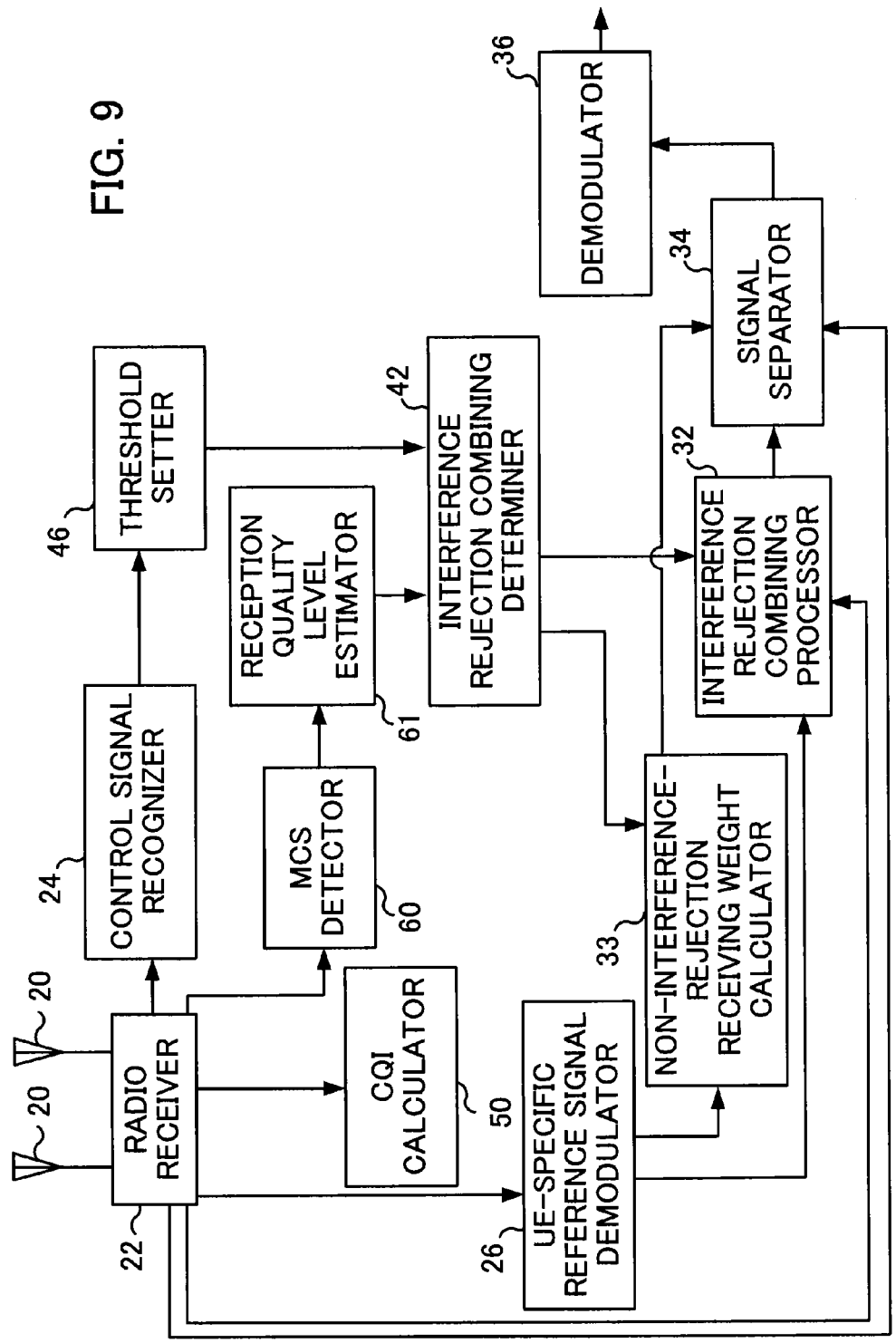
FIG. 9 is a block diagram showing the structure of a radio communication system according to a fourth embodiment of the present invention.

FIG. 9 is a block diagram showing the structure of a mobile communication terminal according to a fourth embodiment of the present invention. FIG. 9 shows only parts involved in signal reception and does not show other parts. In FIG. 9, the same reference symbols are used to identify elements commonly used in the first embodiment in FIG. 5, and these elements will not be described in detail.

The mobile communication terminal according to the fourth embodiment includes a modulation-and-coding-scheme (MCS) detector 60 for detecting a modulation-and-coding scheme (MCS) applied to the data signal received from the desired base station, and a reception quality level estimator 61 for estimating the reception quality level at the mobile communication terminal from the MCS detected by the MCS detector 60.

The mobile communication terminal further includes a CQI calculator 50 that is similar to that in the third embodiment. The CQI calculated by the CQI calculator 50 is fed back to the desired base station for the mobile communication terminal. On the basis of the CQI fed back from the mobile communication terminal, the desired base station decides the MCS for downlink transmission of the data signal to the mobile communication terminal. With the use of the decided MCS, the desired base station conducts downlink transmission of the data signal to the mobile communication terminal.

The MCS is a combination of a modulation scheme (such as QPSK or 16QAM) and a coding rate (such as 1/2, 2/3, or 3/4). If the CQI fed back from the mobile communication terminal indicates a good reception quality, the base station will select an MCS suitable for a good reception quality, for example, the combination of 16QAM and the coding rate 3/4. If the CQI fed back from the mobile communication terminal indicates a bad reception quality, the base station will select an MCS suitable for a bad reception quality, for example, the combination of QPSK and the coding rate 1/2.

The MCS detector 60 detects the MCS that is being used for downlink transmission of the data signal received by the mobile communication terminal. The reception quality level estimator 61 estimates the reception quality level $L_Q$ at the mobile communication terminal on the basis of the MCS detected by the MCS detector 60. For example, if the MCS is the combination of 16QAM and the coding rate 3/4, the reception quality level estimator 61 estimates that the reception quality level is high. For example, if the MCS is the combination of QPSK and the coding rate 1/2, the reception quality level estimator 61 estimates that the reception quality level is low.

The interference rejection combining determiner 42 compares the reception quality level $L_Q$ estimated by the reception quality level estimator 61 with a threshold $Th_L$. If the reception quality level $L_Q$ is less than the threshold $Th_L$, the interference rejection combining determiner 42 determines to cause the interference rejection combining processor 32 to calculate the receiving weights, deactivates the non-interference-rejection receiving weight calculator 33, and activates the interference rejection combining processor 32. For example, if an MCS corresponding to a bad reception quality, such as the combination of QPSK and the coding rate 1/2, is being used, the non-interference-rejection receiving weight calculator 33 is not activated and the interference rejection combining processor 32 is activated.

If the reception quality level $L_Q$ is greater than the threshold $Th_L$, the interference rejection combining determiner 42 determines not to cause the interference rejection combining processor 32 to calculate the receiving weights, deactivates the interference rejection combining processor 32, and activates the non-interference-rejection receiving weight calculator 33. For example, if an MCS corresponding to a good reception quality, such as the combination of 16QAM and the coding rate 3/4, is being used, the interference rejection combining processor 32 is not activated and the non-interference-rejection receiving weight calculator 33 is activated.

Therefore, if the mobile communication terminal is located at the center of a cell, receiving weights for interference rejection combining are not calculated, and instead, the receiving weights calculated by the non-interference-rejection receiving weight calculator 33 are used for signal separation at the signal separator 34. Accordingly, it is possible to ensure good reception quality. On the other hand, if the mobile communication terminal is located at the edge of a cell and is likely affected by interfering signals, receiving weights for interference rejection combining are calculated, so that these receiving weights are used for signal separation at the signal separator 34. Accordingly, it is possible to ensure good reception quality.

In this embodiment, if the desired base station for the mobile communication terminal is a small base station, the threshold setter 46 sets the threshold $Th_L$ at a higher level to increase opportunities in which the interference rejection combining processor 32 is activated. On the other hand, if the desired base station for the mobile communication terminal is a macro-cell base station, the threshold setter 46 sets the threshold $Th_L$ at a lower level to decrease opportunities in which the interference rejection combining processor 32 is activated. As similar to the first and second embodiments, the threshold setter 46 sets the threshold $Th_L$ on the basis of the cell ID signaled from the desired base station to the mobile communication terminal.

Fifth Embodiment

Figure 10:
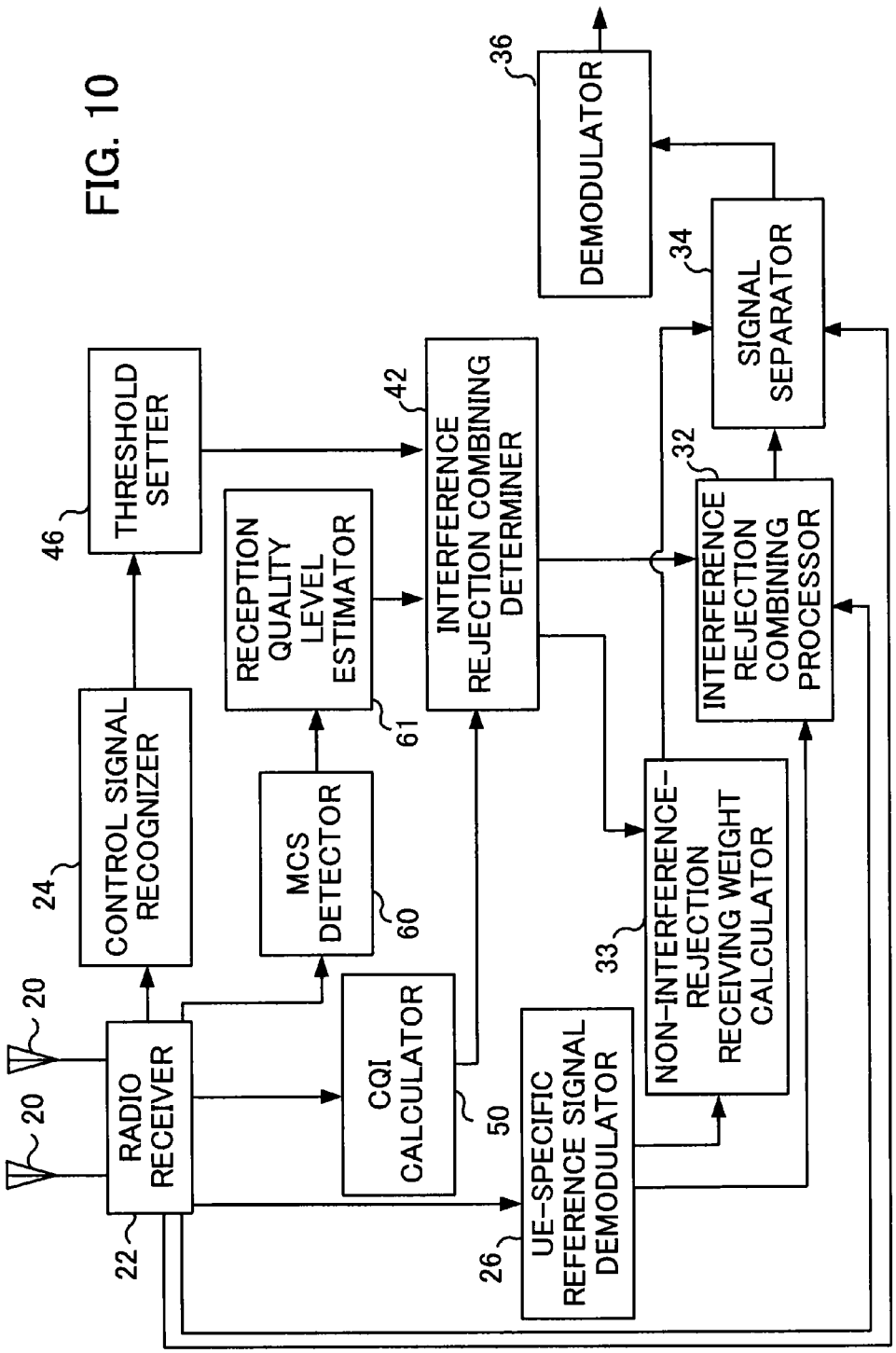
FIG. 10 is a block diagram showing the structure of a radio communication system according to a fifth embodiment of the present invention.

FIG. 10 is a block diagram showing the structure of a mobile communication terminal according to a fifth embodiment of the present invention. FIG. 10 shows only parts involved in signal reception and does not show other parts. The fifth embodiment is a combination of the third embodiment shown in FIG. 8 and the fourth embodiment shown in FIG. 9. In FIG. 10, the same reference symbols are used to identify elements commonly used in FIGS. 8 and 9, and these elements will not be described in detail.

The mobile communication terminal according to the fifth embodiment includes a CQI calculator 50 that is similar to that in the third embodiment, and an MCS detector 60 and a reception quality level estimator 61 that is similar to those in the fourth embodiment. The CQI calculated by the CQI calculator 50 is supplied to the interference rejection combining determiner 42, and the reception quality level $L_Q$ calculated by the reception quality level is also supplied to the interference rejection combining determiner 42.

In the fifth embodiment, the CQI calculated by the CQI calculator 50 is less than the a first threshold $Th_C$, the interference rejection combining determiner 42 determines to cause the interference rejection combining processor 32 to calculate the receiving weights, and activates the interference rejection combining processor 32, regardless of the reception quality level $L_Q$ estimated by the reception quality level estimator 61.

If the reception quality level $L_Q$ estimated by the reception quality level estimator 61 is less than a second threshold $Th_L$, the interference rejection combining determiner 42 also determines to cause the interference rejection combining processor 32 to calculate the receiving weights, and activates the interference rejection combining processor 32, regardless of the CQI calculated by the CQI calculator 50.

If the CQI is greater than the first threshold $Th_C$ and the reception quality level $L_Q$ is greater than the second threshold $Th_L$, the interference rejection combining determiner 42 determines not to cause the interference rejection combining processor 32 to calculate the receiving weights, deactivates the interference rejection combining processor 32, and activates the non-interference-rejection receiving weight calculator 33. Consequently, the interference rejection combining processor 32 is deactivated only if the CQI is high and the reception quality level $L_Q$ corresponding to the MCS is also high.

As described above, since the base station decides the MCS on the basis of the CQI fed back from the mobile communication terminal, the CQI calculated in the mobile communication terminal is related in some degree to the MCS detected by the mobile terminal. However, the base station may decide the MCS not only on the basis of the CQI fed back from the mobile communication terminal, but also on the basis of other circumstances. In addition, the criteria used in the base station for deciding the MCS from the CQI is not limited to be completely in the inverse relation to the criteria used by the MCS detector 60 in the mobile communication terminal for deciding the reception quality level $L_Q$ from the MCS. Thus, although the CQI calculated by the CQI calculator 50 is related in some degree to the reception quality level $L_Q$ estimated by the reception quality level estimator 61, they do not necessarily have a one to one relation. In the fifth embodiment, in which it is determined whether the interference rejection combining processor 32 should be activated or the receiving weights calculated by the non-interference-rejection receiving weight calculator 33 should be used, on the basis of both the reception quality level $L_Q$ obtained from the MCS and the CQI, there is a likelihood that a more suitable determination can be made.

In this embodiment, if the desired base station for the mobile communication terminal is a small base station, the threshold setter 46 sets the first threshold $Th_C$ and the second threshold $Th_L$ higher in order to increase opportunities in which the interference rejection combining processor 32 is activated. On the other hand, if the desired base station for the mobile communication terminal is a macro-cell base station, the threshold setter 46 sets the first threshold $Th_C$ and the second threshold $Th_L$ lower in order to decrease opportunities in which the interference rejection combining processor 32 is activated. As similar to the first and second embodiments, the threshold setter 46 sets these thresholds on the basis of the cell ID signaled from the desired base station to the mobile communication terminal.

Sixth Embodiment

The structure of a mobile communication terminal according to a sixth embodiment of present invention is the same as that of the fifth embodiment that has been described with reference to FIG. 10. In the following, characteristics of the sixth embodiment that differ from the fifth embodiment will be described in detail.

In the sixth embodiment, if the CQI calculated by the CQI calculator 50 is less than the first threshold $Th_C$ and the reception quality level $L_Q$ estimated by the reception quality level estimator 61 is less than the second threshold $Th_L$, the interference rejection combining determiner 42 determines to cause the interference rejection combining processor 32 to calculate the receiving weights, and activates the interference rejection combining processor 32.

If the CQI calculated by the CQI calculator 50 is greater than the first threshold $Th_C$, the interference rejection combining determiner 42 determines not to cause the interference rejection combining processor 32 to calculate the receiving weights, deactivates the interference rejection combining processor 32, and activates the non-interference-rejection receiving weight calculator 33, regardless of the reception quality level $L_Q$ estimated by the reception quality level estimator 61.

If the reception quality level $L_Q$ estimated by the reception quality level estimator 61 is greater than the second threshold $Th_L$, the interference rejection combining determiner 42 also determines not to cause the interference rejection combining processor 32 to calculate the receiving weights, deactivates the interference rejection combining processor 32, and activates the non-interference-rejection receiving weight calculator 33, regardless of the CQI calculated by the CQI calculator 50. Consequently, the interference rejection combining processor 32 is activated only if the CQI is low and the reception quality level $L_Q$ corresponding to the MCS is also low.

As described above, although the CQI calculated by the CQI calculator 50 is related in some degree to the reception quality level $L_Q$ estimated by the reception quality level estimator 61, they do not necessarily have a one to one relation. In the sixth embodiment, in which it is determined whether the interference rejection combining processor 32 should be activated or the receiving weights calculated by the non-interference-rejection receiving weight calculator 33 should be used, on the basis of both the reception quality level $L_Q$ obtained from the MCS and the CQI, there is a likelihood that a more suitable determination can be made.

In this embodiment, the threshold setter 46 operates in the same way as in the fifth embodiment.

Seventh Embodiment

In the above-described first embodiment, the threshold setter 46 sets the threshold $Th_R$ on the basis of the cell ID signaled from the desired base station to the mobile communication terminal. In a seventh embodiment, the threshold setter 46 may set the threshold $Th_R$ on the basis of an offset that may be used by the mobile communication terminal at cell selection for handover.

This offset is signaled from the base station to the mobile station. If the source base station having sent the offset is a macro-cell base station, the offset is zero or null. The smaller the transmission power ability of the base station, the greater the offset is. For example, a micro-cell has an offset that is greater than that of a pico-cell, and a femto-cell has an offset that is greater than that of a micro-cell.

At cell selection for handover, the mobile communication terminal compares the reception quality or the reception electric power of a signal sent from a base station (serving cell) to which the mobile communication terminal is currently connecting with the reception quality or the reception electric power of a signal sent from another base station. For example, if Equation (4) below is satisfied, the mobile communication terminal decides that another base station should be selected as a new serving base station.

$$RSRP_O + Off > RSRP_S \quad (4)$$

where RSRP is the reception electric power (reference signal received power) of the reference signal, suffix O indicates another base station, and suffix S indicates the base station to which the mobile communication terminal is currently connecting. Off is the offset.

Alternatively, if Equation (5) below is satisfied, the mobile communication terminal may decide that another base station should be selected as a new serving base station.

$$RSRQ_O + Off > RSRQ_S \quad (5)$$

where RSRQ is the reception quality (reference signal received quality) of the reference signal, suffix O indicates another base station, and suffix S indicates the base station to which the mobile communication terminal is currently connecting. Off is the offset.

The smaller the transmission power ability of the base station, the smaller the cell is. However, the smaller the transmission power ability of the base station, the greater the offset is. Accordingly, at cell selection, by using above Equations (4) or (5), many mobile communication terminals can connect to a base station of which transmission power ability is small.

In this embodiment, the control signal recognizer 24 serves as an offset recognizer that recognizes the offset signaled from the base station that is not a macro-cell base station. If the offset recognizer 24 has recognized the offset and the desired base station has sent the offset (i.e., the desired base station is not a macro-cell base station), the threshold setter 46 sets the threshold $Th_R$ higher. As a result, the threshold setter 46 sets the threshold $Th_R$ lower if the desired base station is a macro-cell base station, and sets the threshold $Th_R$ higher if the desired base station is not a macro-cell base station. If the desired base station is a small base station and the mobile communication terminal is likely affected by interference from another base station, the threshold $Th_R$ is set increased, thereby increasing opportunities in which the interference rejection combining processor 32 is activated. On the other hand, if the desired base station is a macro-cell base station and the mobile communication terminal is less likely affected by interference from another base station, the threshold $Th_R$ is set decreased, thereby decreasing opportunities in which the interference rejection combining processor 32 is activated.

In addition, the control signal recognizer 24 may set the threshold $Th_R$ in accordance with the value of the offset. A mobile communication terminal served by a base station of which transmission power ability is small is likely affected by interference from another base station. The smaller the transmission power ability of the base station, the greater the offset is. Accordingly, it is preferable that the threshold setter 46 set the threshold $Th_R$ higher to increase opportunities in which the interference rejection combining processor 32 is activated if the offset is greater.

This seventh embodiment is a modification of the first embodiment. However, the above-described second through sixth embodiments may be modified as similar to the seventh embodiment, so that the threshold $Th_R$, $Th_C$, $Th_L$, or the first threshold $Th_C$ and the second threshold $Th_L$ may be set on the basis of the offset.

Eighth Embodiment

Figure 11:
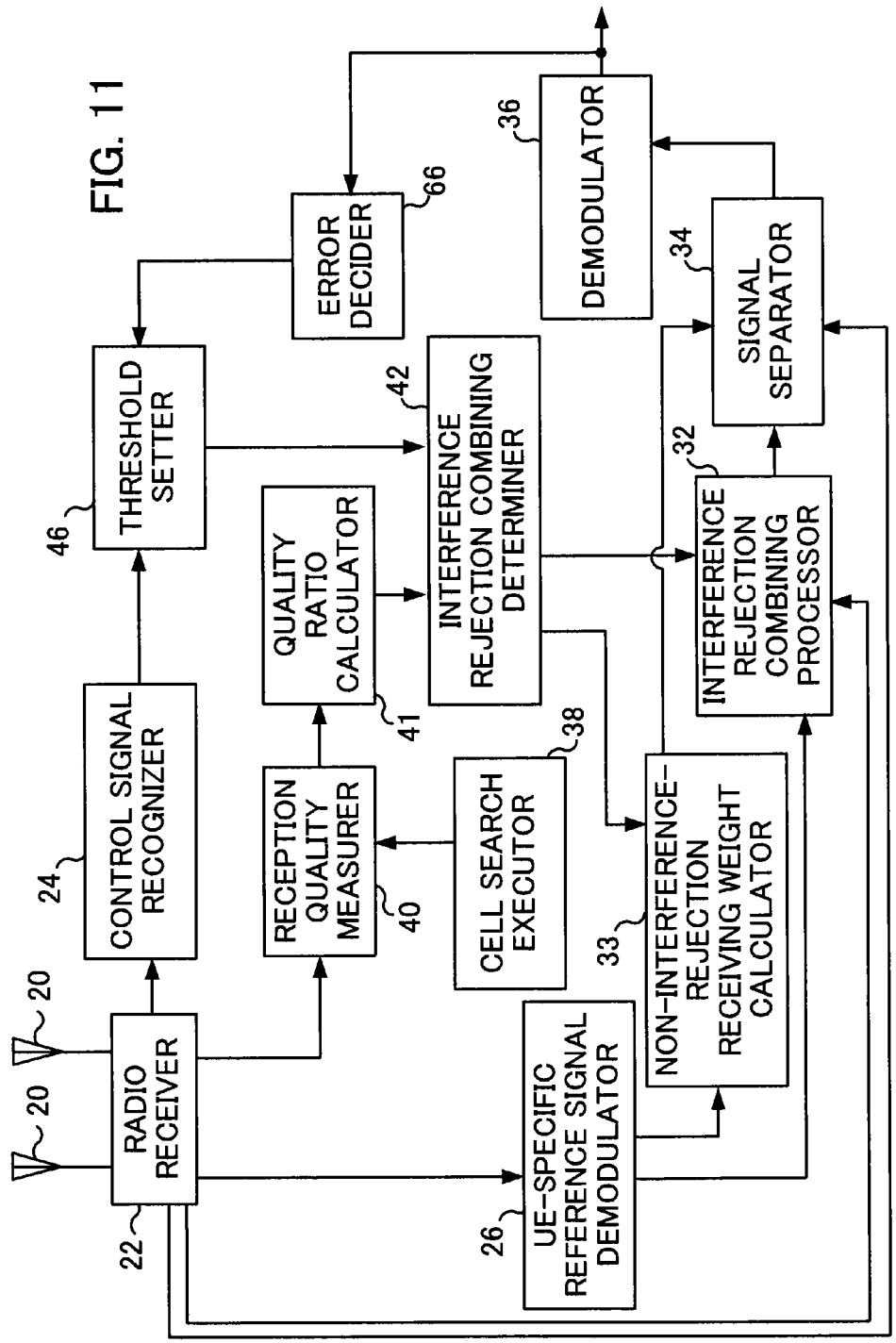
FIG. 11 is a block diagram showing the structure of a radio communication system according to an eighth embodiment of the present invention.

FIG. 11 is a block diagram showing the structure of a mobile communication terminal according to an eighth embodiment of the present invention. FIG. 11 shows only parts involved in signal reception and does not show other parts. In FIG. 11, the same reference symbols are used to identify elements commonly used in the first embodiment in FIG. 5, and these elements will not be described in detail.

The mobile communication terminal according to the eighth embodiment includes an error decider 66 for deciding the existence or non-existence of errors in the data signal demodulated by the demodulator 36. The scheme for error decision may be a known technique, for example, CRC (cyclical redundancy check). If the error decider 66 has found an error, the mobile communication terminal may return a retransmission request or a negative acknowledgement (NACK) to the desired base station.

In this embodiment, the threshold setter 46 sets the threshold $Th_R$ on the basis of error decision by the error decider 66 when the interference rejection combining processor 32 is activated. More specifically, if the error decider 66 has found an error, the threshold setter 46 sets the threshold $Th_R$ decreased. If the error decider 66 has not found any error, the threshold setter 46 maintains the threshold $Th_R$ or sets the threshold $Th_R$ increased.

As a result, if an error has been found in the data signal that was demodulated by the demodulator 36 and was subjected to signal separation with the use of the receiving weights calculated by the interference rejection combining processor 32, the threshold setter 46 sets the threshold $Th_R$ lower, thereby decreasing opportunities in which the interference rejection combining processor 32 is activated. This is because avoidance of interference rejection combining will likely be preferable. In other words, if there is a high possibility that avoidance of interference rejection combining is preferable, the interference rejection combining processor 32 can decrease opportunities in which the interference rejection combining processor 32 is activated.

In this embodiment, the threshold setter 46 may decrease the threshold $Th_R$ whenever a bit error is found by the error decider 66. Alternatively, the threshold setter 46 may decrease the threshold $Th_R$ if an error ratio over a certain time period exceeds a predetermined value.

This eighth embodiment is a modification of the first embodiment. However, the above-described second through sixth embodiments may be modified as similar to the eighth embodiment, so that the threshold $Th_R$, $Th_C$, $Th_L$, or the first threshold $Th_C$ and the second threshold $Th_L$ may be set on the basis of the error decision.

Ninth Embodiment

In the above-described first embodiment, the interference rejection combining determiner 42 determines whether the interference rejection combining processor 32 should be activated or the receiving weights calculated by the non-interference-rejection receiving weight calculator 33 should be used. As a result, the interference rejection combining processor 32 is controlled to be activated or deactivated, and the signal separator 34 uses receiving weights calculated by the interference rejection combining processor 32 or receiving weights calculated by calculated by the non-interference-rejection receiving weight calculator 33 for signal separation.

However, in a ninth embodiment, the interference rejection combining determiner 42 may control the signal separator 34 to use the receiving weights calculated by the interference rejection combining processor 32 or the receiving weights calculated by calculated by the non-interference-rejection receiving weight calculator 33, rather than controlling activation or deactivation of the interference rejection combining processor 32 or non-interference-rejection receiving weight calculator 33.

Tenth Embodiment

Figure 12:
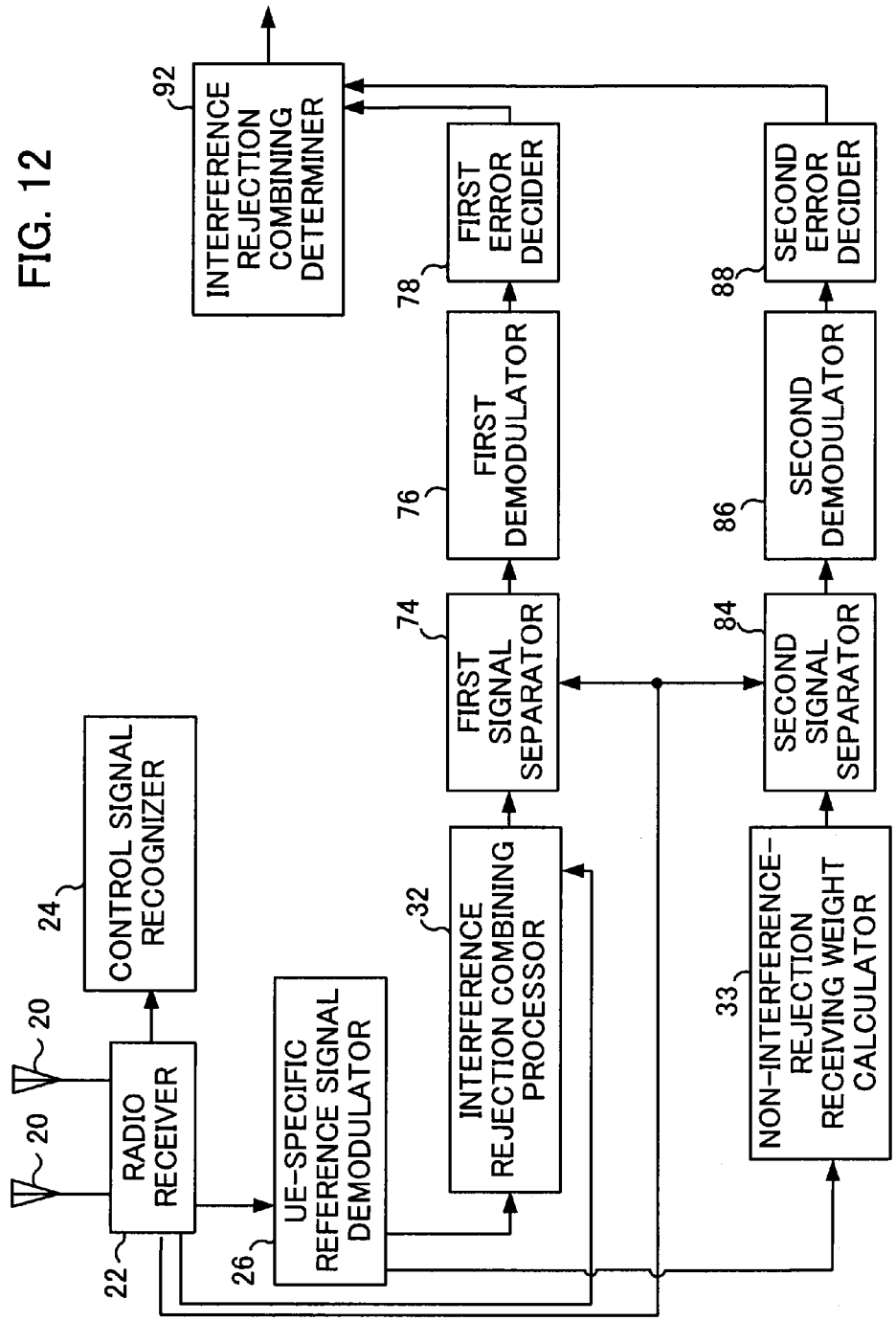
FIG. 12 is a block diagram showing the structure of a radio communication system according to a tenth embodiment of the present invention.

FIG. 12 is a block diagram showing the structure of a mobile communication terminal according to a tenth embodiment of the present invention. FIG. 12 shows only parts involved in signal reception and does not show other parts. In FIG. 12, the same reference symbols are used to identify elements commonly used in the first embodiment in FIG. 5, and these elements will not be described in detail.

In FIG. 12, a first signal separator 74 separates a signal destined for the mobile communication terminal from signals destined for other mobile communication terminals among signals output from the radio receiver 22, with the use of the receiving weights calculated by the interference rejection combining processor 32. A first demodulator 76 demodulates and decodes the signal destined for the mobile communication terminal separated by the first signal separator 74, and obtains a data signal. A first error decider 78 decides the existence or non-existence of errors in the data signal demodulated by the first demodulator 76.

A second signal separator 84 separates a signal destined for the mobile communication terminal from signals destined for other mobile communication terminals among signals output from the radio receiver 22, with the use of the receiving weights calculated by the non-interference-rejection receiving weight calculator 33 and without use of the receiving weights calculated by the interference rejection combining processor 32. In other words, the second signal separator 84 conducts signal separation without interference rejection combining. A second demodulator 86 demodulates and decodes the signal destined for the mobile communication terminal separated by the second signal separator 84, and obtains another data signal. A second error decider 88 decides the existence or non-existence of errors in the data signal demodulated by the second demodulator 86. The scheme for error decision at the first error decider 78 and the second error decider 88 may be a known technique, for example, CRC.

On the basis of error decision by the first error decider 78 and error decision by the second error decider 88, an interference rejection combining determiner 92 determines whether the signal demodulated by the first demodulator 76 or the signal demodulated by the second demodulator 86 should be output. For example, for packets having the same number in two sequences output from the demodulators 76 and 86, if the first error decider 78 decides that the packet has an error and the second error decider 88 decides that the packet is correct, the interference rejection combining determiner 92 outputs the packet of the data signal demodulated by the second demodulator 86. In contrast, for packets having the same number in two sequences output from the demodulators 76 and 86, if the first error decider 78 decides that the packet is correct and the second error decider 88 decides that the packet has an error, the interference rejection combining determiner 92 outputs the packet of the data signal demodulated by the first demodulator 76. In summary, the interference rejection combining determiner 92 outputs the packet decided to be correct. The decision can be made sequentially for each packet. If the packets having the same number are found to be erroneous by both the first error decider 78 and the second error decider 88, the mobile communication terminal returns a retransmission request or a negative acknowledgement to the desired base station. Thus, correct packets are output from the interference rejection combining determiner 92, and are used by a processing device (not shown, for example, an image display device or a speaker) in the mobile communication terminal.

It is determined which of the signal demodulated by the first demodulator 76 and the signal demodulated by the second demodulator 86 should be output, on the basis of the error decision for the signal that was subject to interference rejection combining and on the basis of the error decision for the signal that was not subject to interference rejection combining. Accordingly, for a mobile communication terminal that is less likely affected by interfering signals (for example, a mobile communication terminal 10 located at the center of a cell), the signal demodulated by the second demodulator 86 that is not subject to the receiving weights for interference rejection combining is output, and it is possible to ensure good reception quality.

Furthermore, once the first error decider 78 finds an error in the data signal, the interference rejection combining determiner 92 may deactivate the interference rejection combining processor 32. Alternatively, if the error ratio of the errors found by the first error decider 78 is high, the interference rejection combining determiner 92 may deactivate the interference rejection combining processor 32. After deactivating the interference rejection combining processor 32, only the data signals demodulated by the second demodulator 86 will be output and will be used in the mobile communication terminal.

When a predetermined time has elapsed after deactivating the pressure interference rejection combining processor 32, the interference rejection combining determiner 92 may activate the interference rejection combining processor 32 again and may restart the determination on the basis of the decisions at the first error decider 78 and the second error decider 88. Alternatively, if the second error decider 88 finds an error in the data signal demodulated by the second demodulator 86, or if the error ratio of the errors found by the second error decider 88 is high, the interference rejection combining determiner 92 may activate the interference rejection combining processor 32 again and may restart the determination on the basis of the decisions at the first error decider 78 and the second error decider 88.

Other Variations

In the mobile communication terminal, functions executed by the CPU may be executed by hardware or a programmable logic device, such as an FPGA (Field Programmable Gate Array) or a DSP (Digital Signal Processor), instead of the CPU.

In the above-described embodiments, channel impulse parameters and precoding parameters are represented as matrices. However, at least one type of these parameters may be represented in another fashion, and the receiving weights may be calculated by a mathematical scheme other than calculation of matrices.

The above-described embodiments and variations may be combined unless inconsistency arises.

REFERENCE SYMBOLS

1, 2, And 3: Base Station
4: Small Base Station
10: Mobile Communication Terminal
12: Mobile Communication Terminal
20: Receiving Antennas
22: Radio Receiver
24: Control Signal Recognizer (Offset Recognizer)
26: UE-Specific Reference Signal Demodulator
32: Interference Rejection Combining Processor
33: Non-Interference-Rejection Receiving Weight Calculator
34: Signal Separator
36: Demodulator
38: Cell Search Executor
40: Reception Quality Measurer
41: Quality Ratio Calculator
42: Interference Rejection Combining Determiner
46: Threshold Setter
50: Channel Quality Indicator (CQI) Calculator
60: Modulation-And-Coding-Scheme (MCS) Detector
61: Reception Quality Level Estimator
66: Error Decider
74: First Signal Separator
76: First Demodulator
78: First Error Decider
84: Second Signal Separator
86: Second Demodulator
88: Second Error Decider
92: Interference Rejection Combining Determiner

The invention claimed is:

1. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a non-interference-rejection receiving weight calculator adapted for calculating receiving weights so as not to suppress influence to the desired beam of electric wave sent from the desired base station by other beams;

a signal separator adapted for separating a signal destined for the mobile communication terminal from signals destined for other mobile communication terminals among signals derived from electric waves received at the multiple receiving antennas;

an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, a reception quality measurer adapted for measuring reception qualities of signals sent from different base stations and received by the mobile communication terminal in order to facilitate searching the desired base station to which the mobile communication terminal should connect; and a quality ratio calculator adapted for calculating a ratio of a reception quality of a signal from the desired base station measured by the reception quality measurer to a reception quality of a signal from another base station measured by the reception quality measurer, wherein the interference rejection combining determiner is adapted for comparing the ratio calculated by the quality ratio calculator with a threshold, for determining that the receiving weights calculated by the interference rejection combining processor should be used for signal separation by the signal separator if the ratio is less than the threshold, and for determining that the receiving weights calculated by the non-interference-rejection receiving weight calculator should be used for signal separation by the signal separator, instead of the receiving weights calculated by the interference rejection combining processor, if the ratio is greater than the threshold.

2. The mobile communication terminal according to claim 1, further comprising a threshold setter adapted for setting the threshold at a lower level if the desired base station is a macro-cell base station, and for setting the threshold at a higher level if the desired base station is not a macro-cell base station.

3. The mobile communication terminal according to claim 2, wherein the threshold setter is adapted for setting the threshold on the basis of a cell identity signaled from the desired base station to the mobile communication terminal.

4. The mobile communication terminal according to claim 2, further comprising an offset recognizer adapted for recognizing an offset signaled from a base station that is not a macro-cell base station, the offset being added to a reception quality or a reception electric power of a signal sent from the base station that is not a macro-cell base station when a reception quality or a reception electric power of a signal sent from a base station to which the mobile communication terminal is currently connecting is compared with a reception quality or a reception electric power of a signal sent from another base station in order to determine whether or not a new base station to which the mobile communication terminal should newly connect should be selected, wherein the threshold setter is adapted for setting the threshold increased if the offset recognizer has recognized the offset and the desired base station has sent the offset.

5. The mobile communication terminal according to claim 1, further comprising:

a demodulator adapted for demodulating the signal destined for the mobile communication terminal separated by the signal separator with the use of the receiving weights calculated by the interference rejection combining processor;

an error decider adapted for deciding existence or non-existence of errors in the signal demodulated by the demodulator; and a threshold setter adapted for setting the threshold on the basis of error decision by the error decider.

6. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a non-interference-rejection receiving weight calculator adapted for calculating receiving weights so as not to suppress influence to the desired beam of electric wave sent from the desired base station by other beams;

a signal separator adapted for separating a signal destined for the mobile communication terminal from signals destined for other mobile communication terminals among signals derived from electric waves received at the multiple receiving antennas;

an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, a reception quality measurer adapted for measuring reception qualities of signals sent from at least three different base stations and received by the mobile communication terminal in order to facilitate searching the desired base station to which the mobile communication terminal should connect; and a quality ratio calculator adapted for calculating a ratio of a reception quality of a signal from the desired base station measured by the reception quality measurer to a reception quality of a signal from each of at least two base stations measured by the reception quality measurer, wherein the interference rejection combining determiner is adapted for comparing the ratios calculated by the quality ratio calculator with a threshold, for determining that the receiving weights calculated by the interference rejection combining processor should be used for signal separation by the signal separator if the number of the ratios that are less than the threshold is equal to or greater than a predetermined number, and for determining that the receiving weights calculated by the non-interference-rejection receiving weight calculator should be used for signal separation by the signal separator, instead of the receiving weights calculated by the interference rejection combining processor, if the number of the ratios that are less than the threshold is less than the predetermined number.

7. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a non-interference-rejection receiving weight calculator adapted for calculating receiving weights so as not to suppress influence to the desired beam of electric wave sent from the desired base station by other beams;

a signal separator adapted for separating a signal destined for the mobile communication terminal from signals destined for other mobile communication terminals among signals derived from electric waves received at the multiple receiving antennas;

an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, and a channel quality indicator calculator adapted for calculating a channel quality indicator on the basis of power of a signal received from the desired base station and power of the interfering signal, wherein the interference rejection combining determiner is adapted for comparing the channel quality indicator calculated by the channel quality indicator calculator with a threshold, for determining that the receiving weights calculated by the interference rejection combining processor should be used for signal separation by the signal separator if the channel quality indicator is less than the threshold, and for determining that the receiving weights calculated by the non-interference-rejection receiving weight calculator should be used for signal separation by the signal separator, instead of the receiving weights calculated by the interference rejection combining processor, if the channel quality indicator is greater than the threshold.

8. The mobile communication terminal according to claim 7, wherein the interference rejection combining processor is adapted for calculating the receiving weights for each of multiple subcarriers allocated to downlink transmission from the desired base station to the mobile communication terminal, or the receiving weights for a resource block including the subcarriers, wherein the channel quality indicator calculator is adapted for calculating the channel quality indicator for each of multiple subcarriers allocated to downlink transmission from the desired base station to the mobile communication terminal, and wherein the interference rejection combining determiner is adapted for comparing the channel quality indicator for each of the multiple subcarriers calculated by the channel quality indicator calculator with a threshold, for determining that the receiving weights calculated by the interference rejection combining processor should be used for signal separation by the signal separator for the subcarriers in which the channel quality indicator is less than the threshold, and for determining that the receiving weights calculated by the non-interference-rejection receiving weight calculator should be used for signal separation by the signal separator, instead of the receiving weights calculated by the interference rejection combining processor, for the subcarriers in which the channel quality indicator is greater than the threshold.

9. The mobile communication terminal according to claim 7, wherein the interference rejection combining processor is adapted for calculating the receiving weights for each of multiple subcarriers allocated to downlink transmission from the desired base station to the mobile communication terminal, or the receiving weights for a resource block including the subcarriers, wherein the channel quality indicator calculator is adapted for calculating the channel quality indicator for a subband including multiple subcarriers allocated to downlink transmission from the desired base station to the mobile communication terminal, and wherein the interference rejection combining determiner is adapted for comparing the channel quality indicator for the subband calculated by the channel quality indicator calculator with a threshold, for determining that the receiving weights calculated by the interference rejection combining processor should be used for signal separation by the signal separator if the channel quality indicator for the subband is less than the threshold, and for determining that the receiving weights calculated by the non-interference-rejection receiving weight calculator should be used for signal separation by the signal separator, instead of the receiving weights calculated by the interference rejection combining processor, if the channel quality indicator for the subband is greater than the threshold.

10. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a non-interference-rejection receiving weight calculator adapted for calculating receiving weights so as not to suppress influence to the desired beam of electric wave sent from the desired base station by other beams;

a signal separator adapted for separating a signal destined for the mobile communication terminal from signals destined for other mobile communication terminals among signals derived from electric waves received at the multiple receiving antennas;

an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, a modulation-and-coding-scheme detector adapted for detecting a modulation-and-coding scheme applied to a data signal received from the desired base station; and a reception quality level estimator adapted for estimating a reception quality level at the mobile communication terminal from the modulation-and-coding scheme detected by the modulation-and-coding-scheme detector, wherein the interference rejection combining determiner is adapted for comparing the reception quality level estimated by the reception quality level estimator with a threshold, for determining that the receiving weights calculated by the interference rejection combining processor should be used for signal separation by the signal separator if the reception quality level is less than the threshold, and for determining that the receiving weights calculated by the non-interference-rejection receiving weight calculator should be used for signal separation by the signal separator, instead of the receiving weights calculated by the interference rejection combining processor, if the reception quality level is greater than the threshold.

11. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a non-interference-rejection receiving weight calculator adapted for calculating receiving weights so as not to suppress influence to the desired beam of electric wave sent from the desired base station by other beams;

a signal separator adapted for separating a signal destined for the mobile communication terminal from signals destined for other mobile communication terminals among signals derived from electric waves received at the multiple receiving antennas;

an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, a channel quality indicator calculator adapted for calculating a channel quality indicator on the basis of power of a signal received from the desired base station and power of the interfering signal;

a modulation-and-coding-scheme detector adapted for detecting a modulation-and-coding scheme applied to a data signal received from the desired base station; and a reception quality level estimator adapted for estimating a reception quality level at the mobile communication terminal from the modulation-and-coding scheme detected by the modulation-and-coding-scheme detector, wherein the interference rejection combining determiner is adapted for determining that the receiving weights calculated by the interference rejection combining processor should be used for signal separation by the signal separator if the channel quality indicator calculated by the channel quality indicator calculator is less than a first threshold, for determining that the receiving weights calculated by the interference rejection combining processor should be used for signal separation by the signal separator if the reception quality level estimated by the reception quality level estimator is less than a second threshold, and for determining that the receiving weights calculated by the non-interference-rejection receiving weight calculator should be used for signal separation by the signal separator, instead of the receiving weights calculated by the interference rejection combining processor, if the channel quality indicator calculated by the channel quality indicator calculator is greater than the first threshold and if the reception quality level estimated by the reception quality level estimator is greater than the second threshold.

12. The mobile communication terminal according to claim 11, further comprising a threshold setter adapted for setting each of the first threshold and the second threshold at a lower level if the desired base station is a macro-cell base station, and for setting each of the first threshold and the second threshold at a higher level if the desired base station is not a macro-cell base station.

13. The mobile communication terminal according to claim 12, wherein the threshold setter is adapted for setting the first threshold and the second threshold on the basis of a cell identity signaled from the desired base station to the mobile communication terminal.

14. The mobile communication terminal according to claim 12, further comprising an offset recognizer adapted for recognizing an offset signaled from a base station that is not a macro-cell base station, the offset being added to a reception quality or a reception electric power of a signal sent from the base station that is not a macro-cell base station when a reception quality or a reception electric power of a signal sent from a base station to which the mobile communication terminal is currently connecting is compared with a reception quality or a reception electric power of a signal sent from another base station in order to determine whether or not a new base station to which the mobile communication terminal should newly connect should be selected, wherein the threshold setter is adapted for setting the first threshold and the second threshold increased if the offset recognizer has recognized the offset and the desired base station has sent the offset.

15. The mobile communication terminal according to claim 11, further comprising:

a demodulator adapted for demodulating the signal destined for the mobile communication terminal separated by the signal separator;

an error decider adapted for deciding existence or non-existence of errors in the signal demodulated by the demodulator; and a threshold setter adapted for setting the first threshold and the second threshold on the basis of error decision by the error decider.

16. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a non-interference-rejection receiving weight calculator adapted for calculating receiving weights so as not to suppress influence to the desired beam of electric wave sent from the desired base station by other beams;

a signal separator adapted for separating a signal destined for the mobile communication terminal from signals destined for other mobile communication terminals among signals derived from electric waves received at the multiple receiving antennas;

an interference rejection combining determiner adapted for determining whether the receiving weights calculated by the interference rejection combining processor or the receiving weights calculated by the non-interference-rejection receiving weight calculator should be used for signal separation by the signal separator, on the basis of an index representing a relationship between reception quality of a downlink transmission signal from the desired base station to the mobile communication terminal and reception quality of an interfering signal sent from another base station and received by the mobile communication terminal, a channel quality indicator calculator adapted for calculating a channel quality indicator on the basis of power of a signal received from the desired base station and power of the interfering signal;

a modulation-and-coding-scheme detector adapted for detecting a modulation-and-coding scheme applied to a data signal received from the desired base station; and a reception quality level estimator adapted for estimating a reception quality level at the mobile communication terminal from the modulation-and-coding scheme detected by the modulation-and-coding-scheme detector, wherein the interference rejection combining determiner is adapted for determining that the receiving weights calculated by the interference rejection combining processor should be used for signal separation by the signal separator if the channel quality indicator calculated by the channel quality indicator calculator is less than a first threshold and if the reception quality level estimated by the reception quality level estimator is less than a second threshold, for determining that the receiving weights calculated by the non-interference-rejection receiving weight calculator should be used for signal separation by the signal separator, instead of the receiving weights calculated by the interference rejection combining processor, if the channel quality indicator calculated by the channel quality indicator calculator is greater than the first threshold, and for determining that the receiving weights calculated by the non-interference-rejection receiving weight calculator should be used for signal separation by the signal separator, instead of the receiving weights calculated by the interference rejection combining processor, if the reception quality level estimated by the reception quality level estimator is greater than the second threshold.

17. A mobile communication terminal for receiving downlink signals from a desired base station by orthogonal frequency division multiple access, comprising:

multiple receiving antennas for receiving electric waves;

an interference rejection combining processor adapted for obtaining a received signal vector with regard to each of multiple resource elements from signals derived from electric waves received by the multiple receiving antennas, and adapted for calculating receiving weights so as to suppress influence to a desired beam of electric wave sent from the desired base station by other beams, on the basis of the received signal vectors;

a first signal separator adapted for separating a signal destined for the mobile communication terminal from signals destined for other mobile communication terminals among signals derived from electric waves received at the multiple receiving antennas, with the use of the receiving weights calculated by the interference rejection combining processor;

a first demodulator adapted for demodulating the signal destined for the mobile communication terminal separated by the first signal separator;

a first error decider adapted for deciding existence or non-existence of errors in the signal demodulated by the first demodulator;

a non-interference-rejection receiving weight calculator adapted for calculating receiving weights so as not to suppress influence to the desired beam of electric wave sent from the desired base station by other beams;

a second signal separator adapted for separating a signal destined for the mobile communication terminal from signals destined for other mobile communication terminals among signals derived from electric waves received at the multiple receiving antennas, with the use of the receiving weights calculated by the non-interference-rejection receiving weight calculator and without use of the receiving weights calculated by the interference rejection combining processor;

a second demodulator adapted for demodulating the signal destined for the mobile communication terminal separated by the second signal separator;

a second error decider adapted for deciding existence or non-existence of errors in the signal demodulated by the second demodulator; and an interference rejection combining determiner adapted for determining whether the signal demodulated by the first demodulator or the signal demodulated by the second demodulator should be output, on the basis of error decision by the first error decider and error decision by the second error decider.

* * * * *